United States Patent
Frost

(10) Patent No.: US 11,563,379 B2
(45) Date of Patent: Jan. 24, 2023

(54) PHASE CURRENT BALANCING FOR MULTIPHASE COUPLED INDUCTOR CONVERTER

(71) Applicant: Advanced Energy Industries, Inc., Fort Collins, CO (US)

(72) Inventor: Daryl Frost, Windsor, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 0 days.

(21) Appl. No.: 17/306,247

(22) Filed: May 3, 2021

(65) Prior Publication Data
US 2022/0352823 A1   Nov. 3, 2022

(51) Int. Cl.
*H02M 3/158* (2006.01)
*H02M 1/084* (2006.01)

(52) U.S. Cl.
CPC ....... *H02M 3/1584* (2013.01); *H02M 1/0845* (2013.01); *H02M 3/1586* (2021.05)

(58) Field of Classification Search
CPC .......................... H02M 3/1584; H02M 3/1586
See application file for complete search history.

(56) References Cited

U.S. PATENT DOCUMENTS

| | | | |
|---|---|---|---|
| 6,628,106 B1 | 9/2003 | Batarseh et al. | |
| 6,943,535 B1 | 9/2005 | Schiff | |
| 7,733,675 B2 | 6/2010 | Wu et al. | |
| 8,067,929 B2 | 11/2011 | Huang et al. | |
| 8,330,439 B2 | 12/2012 | Wu | |
| 8,415,933 B2 | 4/2013 | Loikkanen et al. | |
| 10,008,918 B2 | 6/2018 | Wibowo et al. | |
| 10,056,819 B1 | 8/2018 | Couleur et al. | |
| 2012/0217948 A1* | 8/2012 | Bouchez | H02M 7/483 323/304 |
| 2015/0077079 A1* | 3/2015 | Ejury | H02M 3/1584 323/282 |
| 2018/0013347 A1 | 1/2018 | Rajarshi et al. | |

FOREIGN PATENT DOCUMENTS

| | | |
|---|---|---|
| CN | 106374596 A | 2/2017 |
| CN | 107370386 A | 11/2017 |
| EP | 2251966 A1 | 4/2012 |
| JP | 4877459 B2 | 2/2012 |
| JP | 2018014855 A | 1/2018 |

* cited by examiner

*Primary Examiner* — Kyle J Moody
*Assistant Examiner* — Lakaisha Jackson
(74) *Attorney, Agent, or Firm* — Neugeboren O'Dowd PC

(57) ABSTRACT

This disclosure describes systems, methods, and apparatus for reducing current imbalances between phases in a multiphase converter as well as reducing instances of particular phases switching twice within a single pulse-width modulated cycle, or other time period. Phases that have not switched for a longest period of time can be compared to see if swapping their firing patterns would reduce current imbalances, and if so, then those firing patterns can be swapped.

5 Claims, 19 Drawing Sheets

PHASE CURRENT BALANCING FOR MULTIPHASE COUPLED INDUCTOR CONVERTER

FIELD OF THE DISCLOSURE

The present disclosure relates generally to power conversion. In particular, but not by way of limitation, the present disclosure relates to systems, methods and apparatuses for current balancing in a multi-phase switching converter.

DESCRIPTION OF RELATED ART

Multi-Switching within a Single Pulse-Width Modulated Cycle

The multiphase buck converter is used in power electronics and RF amplifiers to reduce output ripple and improve response times as compared to single-switch power converters. However, when large swings in voltage are needed, individual switches in the multiphase buck converter may be commanded to cycle more than once in a pulse-width modulated cycle. This can cause excess heating of the switches as well as distortion of the output. Some known solutions include inserting logic into the controller to prohibit multiple switching events for a given switch within the same pulse-width modulated cycle, but this can significantly reduce controller performance. Other known solutions adjust switch duty cycle, but can cause ripple on the output.

To further illustrate the challenge of multi-switching within a pulse-width modulated cycle, FIG. 15 shows firing orders for switches within a multiphase buck converter having 24 switches or phases, and FIG. 16 shows the resulting summed voltage response of the firing order in FIG. 15. One can see that the controller calls for a voltage change at around time 600 and again at around time 3100. To achieve this voltage change, a number of the switches change state twice within a single pulse-width modulation cycle. By this it can be seen that a large change in output voltage can cause a number of switches to perform two switching events in rapid succession. The same can be seen at the second voltage change, at around time 3100. This rapid switching leads to excess heating of the switches and reduced device lifetime. For comparison, no such rapid switching can be seen during the steady state period between the times 600 and 3100.

One known solution is to restrict switching so that each switch turns off along the rising edge of a triangular carrier wave and turns on along the falling edge of the triangular carrier wave. However, this degrades controller performance.

Current Imbalance with Coupled Inductors

Converters using coupled inductors have the complication that DC currents in the inductors can become unbalanced, which can lead to core saturation. DC current imbalance is typically corrected with a control loop that adjusts pulse-widths. It is somewhat complicated to do this without causing disturbances on the output. In any case, this method becomes much more difficult when using the switching strategy described in "Switching Method for Multiphase Coupled Inductor Converter" instead of fixed-phase PWM.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a power conversion device comprising an input and a pulse-width modulation section. The input can be for receiving a control level or waveform. The pulse-width modulation section can be configured to receive the control level or waveform and generate switching signals for a plurality of interleaved switching modules. A summarized output of the plurality of interleaved switching modules can achieve a filtered output corresponding to the control level or waveform. The pulse-width modulation section can be configured to: when a next switching cycle will see an increase in a number of the interleaved switching modules that are on: identify a first switching module that has been off for a longest time as a first switching module and drive the first switching module with a first firing order; identify a second switching module that has been off for a second-longest time as a second switching module and drive the second switching module with a second firing order; and if the first switching module has a filtered output current less than a filtered output current of the second switching module, then: (1) drive the first switching module with the second firing order; and (2) drive the second switching module with the first firing order.

Other embodiments of the disclosure may also be characterized as a power conversion device comprising an input and a pulse-width modulation section. The input can be for receiving a control level or waveform. The pulse-width modulation section can be configured to receive the control level or waveform and generate switching signals for a plurality of interleaved switching modules, a summarized output of the plurality of interleaved switching modules achieving a filtered output corresponding to the control level or waveform, the pulse-width modulation section configured to: determine if swapping firing orders between two of the switching modules will reduce a current imbalance from outputs of these two switching modules, and if so, then, swap these firing orders.

Other embodiments of the disclosure can be characterized as a power conversion system comprising a plurality of interleaved switching modules, a controller, and a pulse-width modulation section. The plurality of interleaved switching modules can each comprise switches in a half-bridge or full-bridge configuration. The plurality of interleaved switching modules can each provide an output to a coupled inductor and outputs of the coupled inductors can be combined to form a summarized output configured for delivery to a load. The controller can be for receiving a control level or waveform. The pulse-width modulation section can be configured to receive a signal from the controller and generate switching signals for the plurality of interleaved switching modules to achieve a value for the summarized output corresponding to the signal from the controller. The pulse-width modulation section can be configured to: drive a first of the interleaved switching modules with a first firing order; drive a second of the interleaved switching modules with a second firing order; if a next switching cycle will see an increase in a number of interleaved switching modules that are on, then: determine if a filtered output of the first of the interleaved switching modules is less than a filtered output of the second of the interleaved switching modules, and if so, then: (1) drive the first switching module with the second firing order; and (2) drive the second switching module with the first firing order; and if the next switching cycle will see a decrease in the number of interleaved switching modules that are on, then: determine if a filtered output of the first of the interleaved switching modules is greater than a filtered output of the second of the interleaved switching modules, and if so, then: (1) drive the first switching module with the second firing order; and (2) drive the second switching module with the first firing order.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
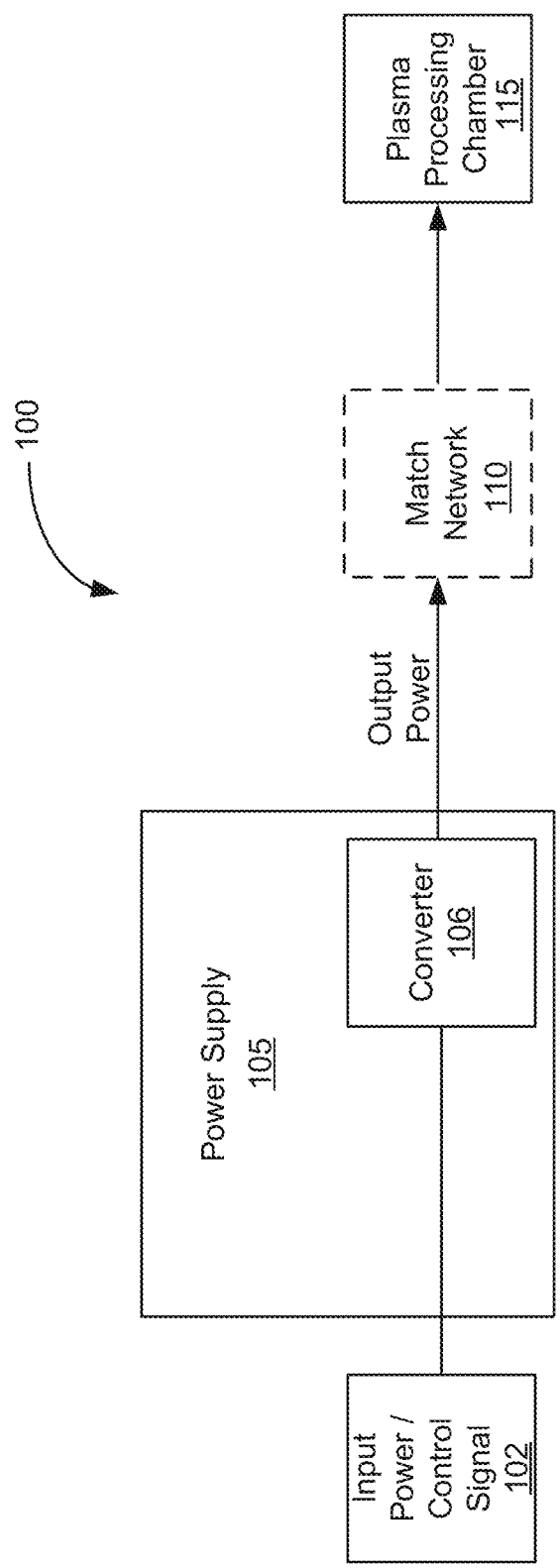
FIG. 1 is a high-level block diagram of a plasma processing system in accordance with an embodiment of this disclosure.

As seen, there is a need for a power converter system and methods that reduces current imbalance between phases and avoids multi-switching of individual switches within a pulse-width modulated cycle (or some other time threshold). The inventor recognized that in a multiphase buck converter where N phases are used to generate a summed output of those N phases, there are $2^N$ possible switch states which produce a total of N+1 discrete voltage levels. Thus, for each voltage level there are many redundant switch states (i.e., a voltage level can be achieved using a variety of different configurations of the N switches). From this the inventor recognized that the controller has freedom to choose between these different configurations without affecting the output level, and thus the controller can select one of these configurations that reduces current imbalances between phases and maximizes intervals between switching for each switch. In one embodiment, when the controller is looking for a switch to switch to achieve a new voltage output, it can select the switch that has been off the longest, or the second longest, or the third longest, or the fourth longest, and swap that switches firing pattern with the firing pattern of another switch if such a swapping would improve current imbalance. In another embodiment, the controller can look for a switch, that if switched, will achieve the desired new voltage output, while also increasing an interval between switching for the selected switch (i.e., it can be the switch that has been off the longest, but does not need to be) and reducing current imbalance between phases. By reducing 'back-to-back' switching, this disclosure allows unrestricted switching under a wider range of conditions, while simultaneously reducing current imbalances between outputs of the multi-phase converter.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIGS. 1-6 illustrate operation of a cascaded multi-level inverter that the herein disclosed switching control can be applied to.

A cascaded multi-level inverter 200 can be used to reduce the voltage over switches in a switching converter. In the design shown in FIG. 2, a number of half- or full-bridge circuits, each having an associated isolated direct-current (DC) power supply, can connected in series (cascaded). If a stack of N full-bridge circuits are used, each with a DC supply of $V_{dc}$ volts, the multi-level inverter 200 can produce a voltage of $\pm N \times V_{dc}$, and it is possible to achieve an overall switching frequency N times higher than the frequency at which each bridge is switched.

Since switching losses are approximately proportional to the applied voltage and to the switching frequency, cascading N full-bridge circuits can decrease switching losses in each device by a factor of $N^2$ and overall switching losses by a factor of N. Of course, since there are now more devices in series to produce the same voltage, resistive losses increase by a factor N, but in many cases switching losses are much higher than resistive losses.

When used as an RF amplifier, unlike lower frequency power electronics, there is a desire to achieve a more controlled output voltage (e.g., down to 0.1 percent of full-rated power).

The basic idea of breaking the total voltage to be produced into smaller increments and cascading sections to produce the full voltage can also be used to break the total current into smaller increments and paralleling stages to produce the full output power. Such an approach is useful to, e.g., deliver power to a very low-impedance load. Examples of parallel-current-source embodiments are described below.

One application for an improved RF switching amplifier is supplying power to a plasma load in a plasma processing chamber. FIG. 1 is a high-level block diagram of a plasma processing system 100 in accordance with an embodiment of this disclosure. In FIG. 1, RF amplifier 105 drives a plasma load (not shown) in plasma processing chamber 115. For example, RF amplifier 105 can be part of a RF generator in a plasma-processing environment. Optionally, depending on the particular embodiment, an impedance-matching network 110 may be interposed between RF amplifier 105 and the plasma load, as shown in FIG. 1.

Figure 2A:
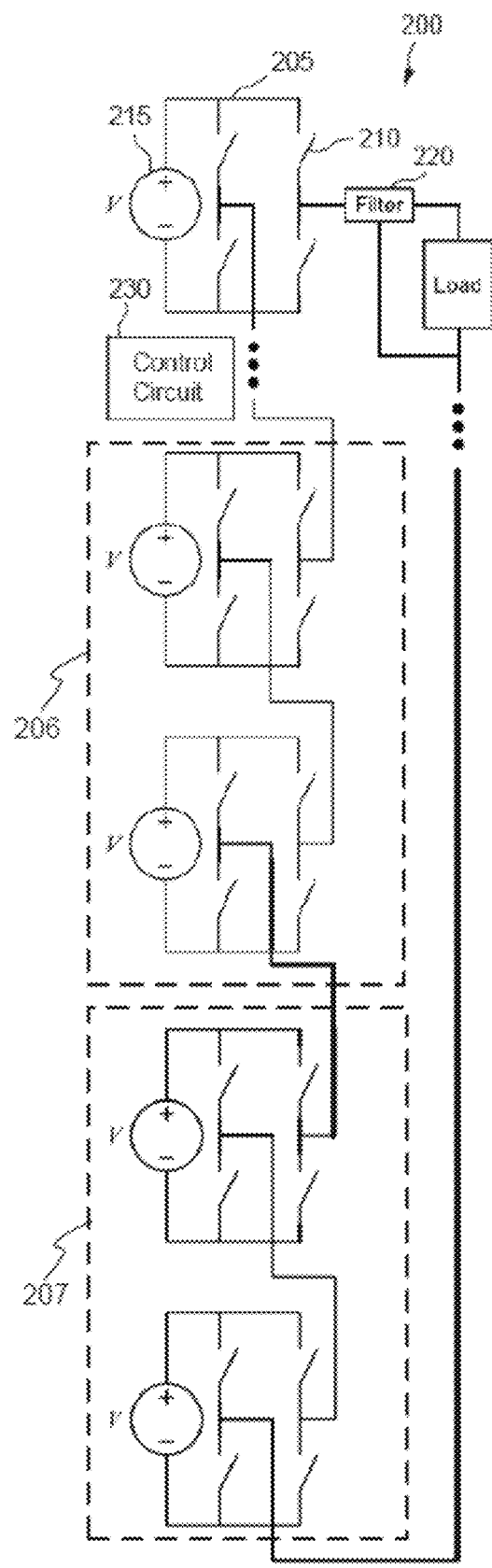
FIGS. 2A and 2B are, respectively, a circuit diagram of a RF amplifier employing voltage sources and a diagram showing switch positions that produce particular output voltages, in accordance with an embodiment of this disclosure.
Figure 2B:
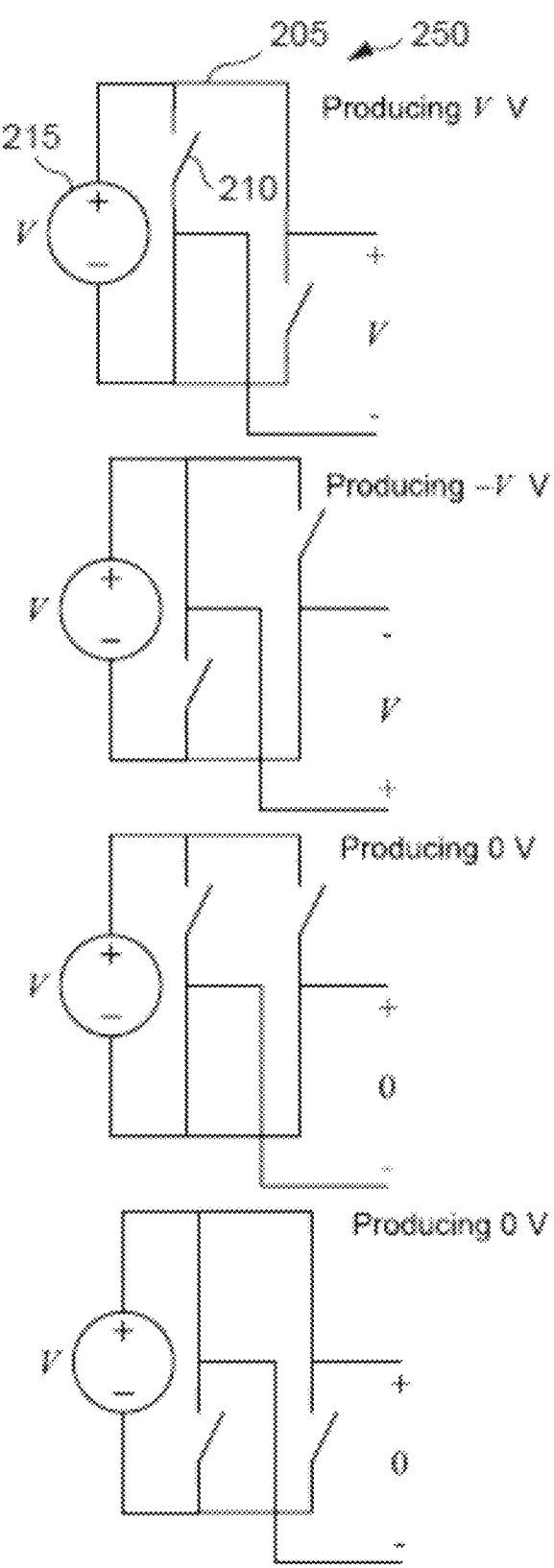

FIGS. 2A and 2B are, respectively, a circuit diagram of a RF amplifier 200 employing voltage sources and a diagram 250 showing switch positions that produce particular output voltages, in accordance with an embodiment of this disclosure.

FIG. 2A depicts a RF amplifier 200 that includes a basic cascaded multi-level inverter employing voltage sources and full-bridge circuits. The RF amplifier includes multiple switch modules 205 connected in a cascade (series) configuration. In this embodiment, each switch module 205 includes four switching devices 210 electrically interconnected in a full-bridge circuit and electrically connected with a DC voltage source 215. An output filter 220 (e.g., a low-pass or band-pass filter) is electrically connected between the output terminals of RF amplifier 200 and load 225. Control circuit 230 controls the switching (state changes) of switching devices 210 to change the voltage produced by each switch module 205 as needed during operation. Though, for simplicity, FIG. 2A shows no connections between control circuit 230 and the switching devices 210, there are, in reality, control lines connecting control circuit 230 with the gates of the respective switching devices 210 (e.g., MOSFET or GaN HEMT devices). Each switching device 210 has an associated "off" state and an associated "on" state. Diagram 250 in FIG. 2B shows the various switch positions in switching modules 205 that produce the indicated voltage levels.

To produce the needed output-voltage resolution, the switch modules 205 are, in this embodiment, divided into disjoint sets (for example, a first set 206 and a second set 207), each set of switch modules 205 having a corresponding distinct peak DC voltage. That is, each DC voltage source 215 in a given set of switch modules 205 is configured to produce the same distinct peak DC voltage, and that distinct peak DC voltage is different from that of any other set of switch modules 205.

The number of switch modules 205 in a given set is determined by the frequency at which those switch modules can be switched. For example, if a maximum output voltage of 500 V is required and a 40-V stage can switch at a 10-MHz rate (meaning it can change state twice within a 10-MHz cycle) into the worst-case output voltage and load and a switching frequency of 28 MHz is required to produce the output, then 500/40×28/10=35 40-V stages may be required. Control circuit 230 can keep track of the states of the switching devices 210 in the respective switch modules 205 of each set and cycle through the switch modules 205 within each set to equalize power dissipation amongst the available switch modules in that set. That is, the least-recently-switched switching devices 210 within each set of switch modules 205 can be switched to their opposite states at each switching interval. Since switching loses are approximately proportional to voltage and switching losses are typically much larger than conduction losses, fewer lower-voltage switch modules 205 are typically required. For example, a design requiring 35 40-V switch modules 205 may require 18 20-V switch modules 205, 9 10-V switch modules 205, 5 5-V switch modules 205, etc.

Several observations can be made regarding the example just mentioned. First, it illustrates that a first distinct peak DC voltage corresponding to a first set of switch modules (e.g., 40 V in the example above) can be an integer multiple of a second distinct peak DC voltage corresponding to a second set of switch modules (20 V in the example above). Second, the above example illustrates that a distinct peak DC voltage (e.g., 40 V), when multiplied by the number of switch modules belonging to the applicable set, can exceed the maximum voltage the RF amplifier is designed to produce. Specifically, 35×(40 V)=1400 V, which exceeds the maximum intended output voltage of 500 V for the RF amplifier discussed above. Third, a second distinct peak DC voltage (e.g., 20 V), when multiplied by the number of switch modules belonging to the applicable set (18, in the above example), can exceed a first distinct peak DC voltage associated with a different set of switch modules (e.g., 40 V). Specifically, 18×(20 V)=360 V, which exceeds 40 V. These same observations apply analogously to embodiments employing current sources and switch modules connected in a parallel configuration, which are discussed further below.

The lowest non-zero-amplitude harmonic in the switch waveform is a function of the ratio of the switching frequency to the output frequency. By changing the ratio as a function of output frequency, the lowest frequency component that needs to be filtered can be controlled. The information summarized in Table 1 assumes the sine function sampled at intervals of $\pi/N$ starting at 0, if N is even, and at $\pi/(2N)$, if N is odd, where $N=f_{sw}/f_{out}$, $f_{out}$ is the output frequency of the generator, and $f_{sw}$ is the switching frequency. Note that $f_{sw}$ is half the rate at which the switch modules 205 change state. With a switching scheme as summarized in Table 1, the frequency at which control pulses for the switches need to be generated is limited to 6×12=72 MHz.

TABLE 1

Switching Frequency as a Function of Output Frequency

| $f_{out}$ (MHz) | $f_{sw}/f_{out}$ | max ($f_{sw}$) (MHz) | 1st Non-Zero Harmonic | Smallest Non-Zero Harmonic Frequency (MHz) | 1st Non-Zero Harmonic Level (dBc) |
|---|---|---|---|---|---|
| <1 | $f_{sw}$ = 28 MHz | 28 | NA | NA | NA |
| 1 to 1.34 | 20 | 26.8 | 39th | 39 | −31.8 |
| 1.34 to 1.9 | 14 | 26.6 | 27th | 36.2 | −28.6 |
| 1.9 to 2.8 | 10 | 28 | 19th | 36.1 | −25.6 |
| 2.8 to 4 | 7 | 28 | 13th | 36.4 | −22.3 |
| 4 to 5.2 | 5 | 26 | 9th | 36 | −19.1 |
| 5.2 to 7.2 | 4 | 28.8 | 7th | 36.4 | −16.9 |
| 7.2 to 12 | 3 | 36 | 5th | 36 | −14.0 |
| 12 to 14.238 | 1 | 14.238 | 3rd | 36 | −9.5 |

Referring again to Table 1, the values of the ratio $f_{sw}/f_{out}$ shown in the second column from the left may be termed $k_i$ for $i \in \{1, 2, \ldots, N\}$, where N is the number of different output-frequency ranges in which the RF amplifier is designed to operate (corresponding to the rows of Table 1). The various output frequencies defining the lower limits of the frequency ranges in the leftmost column of Table 1 can then be represented as $f_{k_i}$. With this notation in mind, there is an output frequency of the RF amplifier $f_{k_1}$ (12 MHz in Table 1) above which the switching devices change state twice within each output cycle, and there is a decreasing sequence of frequencies $\{f_{k_1}, f_{k_2}, \ldots, f_{k_N}\}$ (12, 7.2, 5.2, 4, 2.8, 1.9, 1.34, and 1 MHz, respectively, in Table 1) such that the switching devices change state $2 \times k_{(m+1)}$ times within each output cycle for output frequencies between $f_{k_{(m+1)}}$ and $f_{k_m}$ for $m \in \{1, 2, \ldots, N-1\}$.

In some embodiments, hysteresis is applied to the values of the boundary frequencies $\{f_{k_1}, f_{k_2}, \ldots, f_{k_N}\}$ so that small changes (e.g., less than 10 percent of $f_{k_i}$) in the vicinity of one of the $f_{k_i}$ do not result in a frequent change in the ratio of the switching frequency to the output frequency ($f_{sw}/f_{out}$). Applying hysteresis in this manner increases the stability of the ratio $f_{sw}/f_{out}$ during operation of the RF amplifier.

Figure 3A:
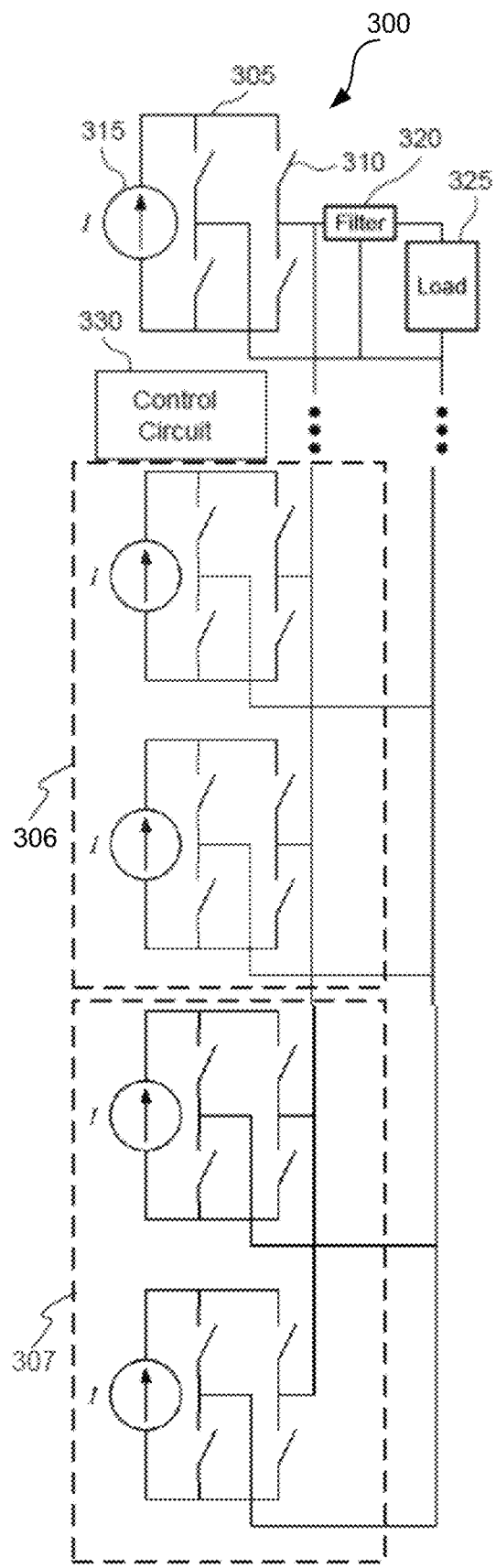
FIGS. 3A and 3B are, respectively, a circuit diagram of a RF amplifier employing current sources and a diagram showing switch positions that produce particular output currents, in accordance with an embodiment of this disclosure.
Figure 3B:
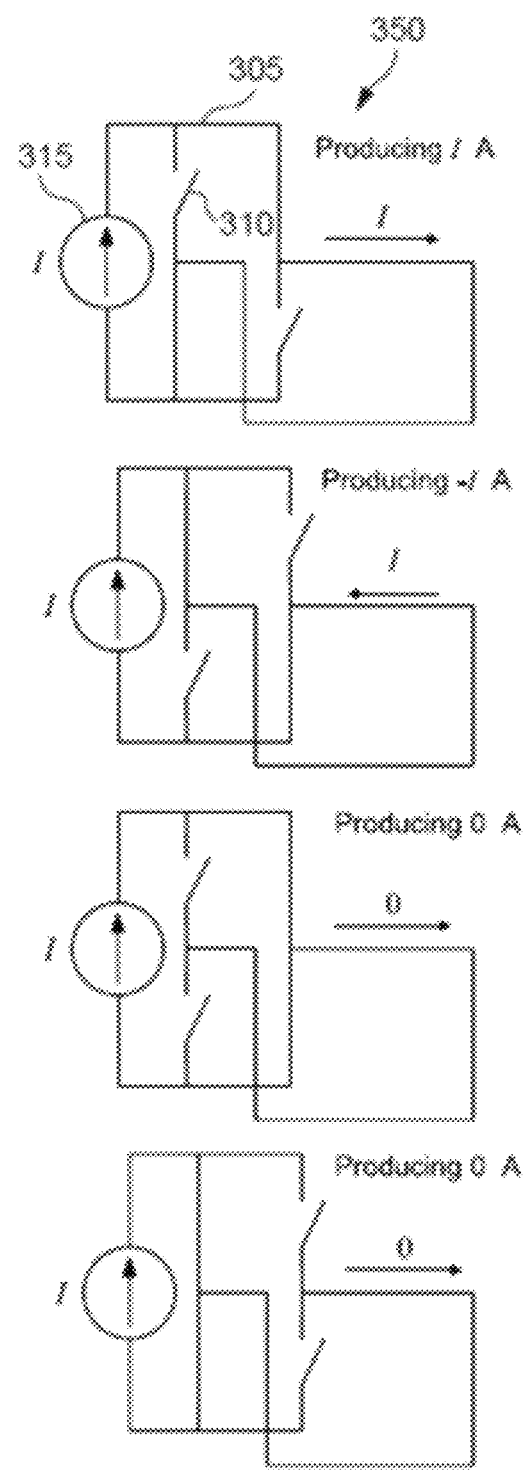

As mentioned above, embodiments of an improved switching amplifier are also possible, and even desirable, in a parallel-current-source configuration. FIGS. 3A and 3B are, respectively, a circuit diagram of a RF amplifier 300 employing current sources and a diagram showing switch positions that produce particular output currents, in accordance with an embodiment of this disclosure.

FIG. 3A depicts a RF amplifier 300 that includes a basic multi-level inverter employing current sources and full-bridge circuits. RF amplifier 300 includes multiple switch modules 305 connected in a parallel configuration. In this particular embodiment, each switch module 305 includes four switching devices 310 electrically interconnected in a full-bridge circuit and electrically connected with a DC current source 315. An output filter 320 (e.g., a low-pass or band-pass filter) is electrically connected between the output terminals of RF amplifier 300 and load 325.

It should be noted that, in cascaded embodiments (see, e.g., FIG. 2A), the switching devices 210 preferably block voltage in only one direction, whereas, with the parallel-connected multi-level inverter shown in FIG. 3A, the switching devices 310 preferably block voltage in both directions, thus typically requiring diodes (not shown in FIG. 3A) in series with semiconductor switches.

As with the cascaded embodiment discussed above in connection with FIGS. 2A and 2B, a control circuit 330 controls the switching (state changes) of switching devices 310 to change the current output by each switch module 305 as needed during operation. Though, for simplicity, FIG. 3A shows no connections between control circuit 330 and the switching devices 310, there are, in reality, control lines connecting control circuit 330 with the gates of the respective switching devices 310 (e.g., MOSFET or GaN HEMT devices). Each switching device 310 has an associated "off" state and an associated "on" state. Diagram 350 in FIG. 3B shows the various switch positions in switching modules 305 that produce the indicated current levels.

As with the cascaded embodiment discussed above in connection with FIGS. 2A and 2B, in the parallel-current-source embodiment of FIG. 3A, the switch modules 305 are divided into disjoint sets (for example, a first set 306 and a second set 307), each set of switch modules 305 having a corresponding distinct peak DC (direct current). That is, each DC current source 315 in a given set of switch modules 305 is configured to produce the same distinct peak DC, and that distinct peak DC is different from that of any other set of switch modules 305.

Figure 4:
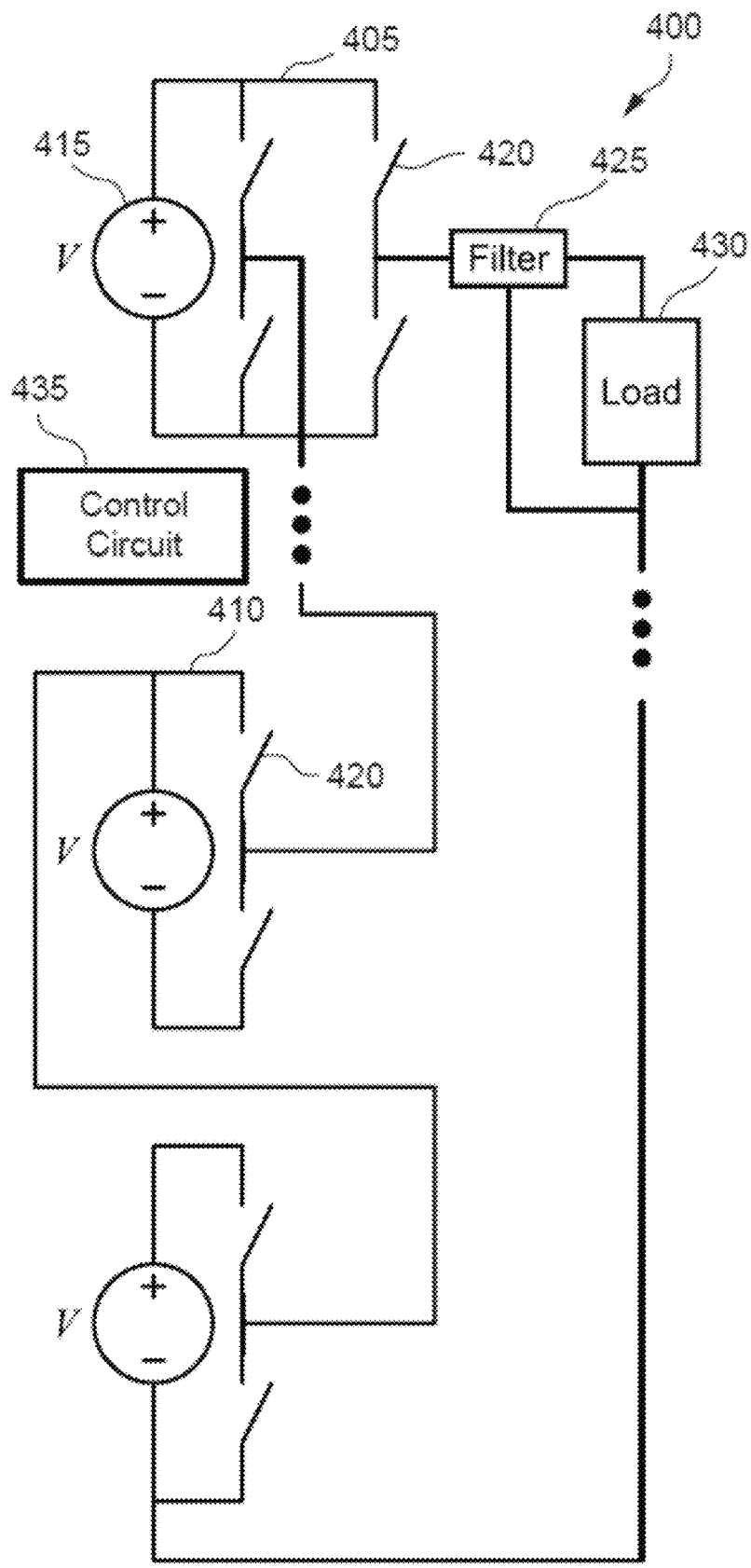
FIG. 4 is a circuit diagram of a RF amplifier employing both half- and full-bridge switch modules with voltage sources, in accordance with an embodiment of this disclosure.

Though the embodiments discussed thus far employ full-bridge circuits for the switching devices, half-bridge circuits or a mixture of full- and half-bridge circuits can be used instead. For example, FIG. 4 is a circuit diagram of a RF amplifier 400 employing both half- and full-bridge switch modules with voltage sources, in accordance with an embodiment of this disclosure. In this embodiment, full-bridge switch modules 405 and half-bridge switch modules 410 are connected in cascade (series) fashion, as in FIGS. 2A and 2B.

In the embodiment shown in FIG. 4, each full-bridge switch module 405 includes four switching devices 420 electrically interconnected in a full-bridge circuit and electrically connected with a DC voltage source 415. Each half-bridge switch module 410 includes two switching devices 420 electrically connected in a half-bridge circuit and electrically connected with a DC voltage source 415. An output filter 425 (e.g., a low-pass or band-pass filter) is electrically connected between the output terminals of RF amplifier 400 and load 430. As in the other embodiments discussed above, a control circuit 435 controls the switching (state changes) of switching devices 420 to change the voltage produced by each switch module 405 or 410 as needed during operation. Though, for simplicity, FIG. 4 shows no connections between control circuit 435 and the switching devices 420, there are, in reality, control lines connecting control circuit 435 with the gates of the respective switching devices 420 (e.g., MOSFET or GaN HEMT devices). Each switching device 420 has an associated "off" state and an associated "on" state.

Figure 5:
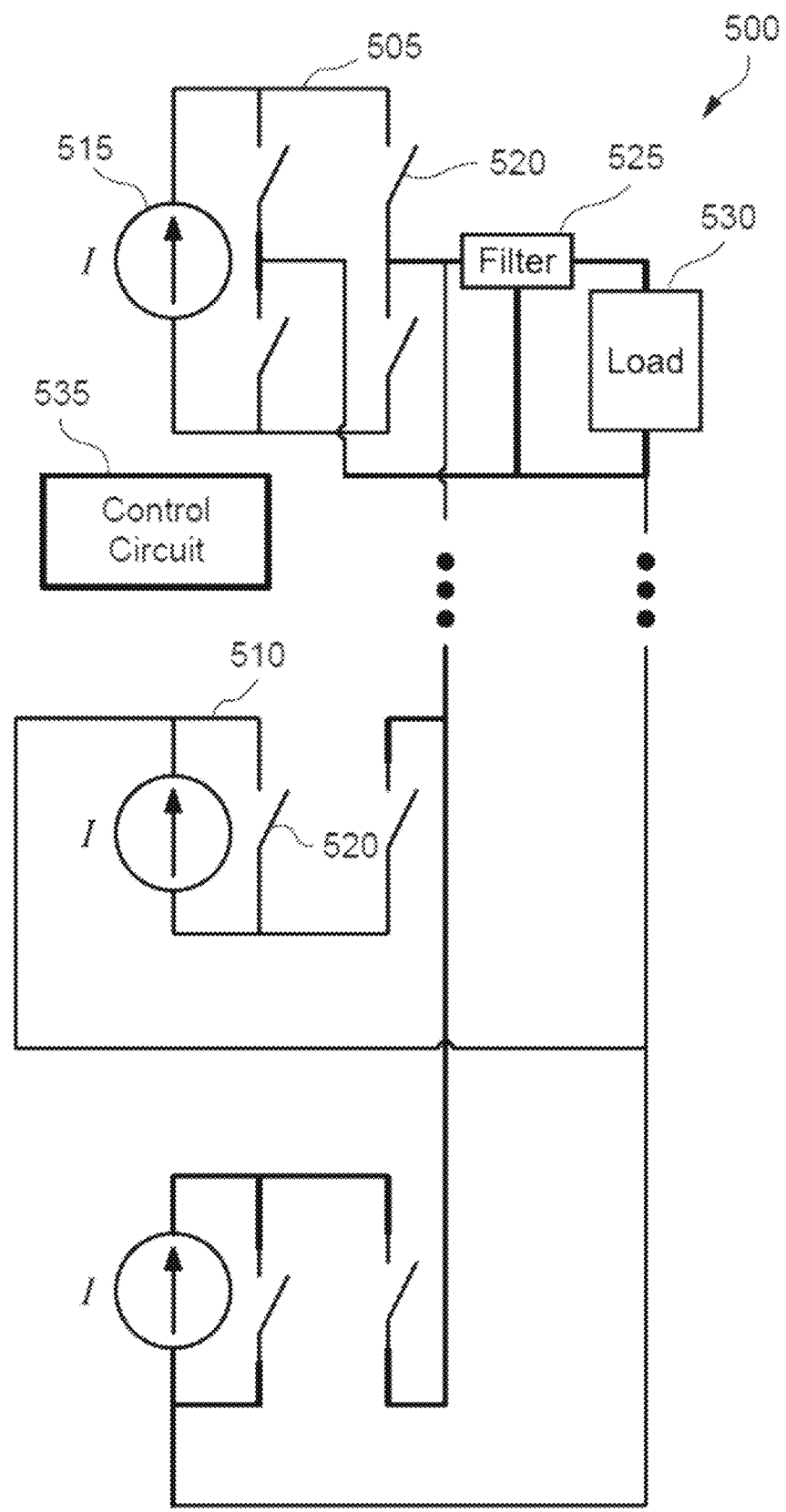
FIG. 5 is a circuit diagram of a RF amplifier employing both half- and full-bridge switch modules with current sources, in accordance with an embodiment of this disclosure.

FIG. 5 is a circuit diagram of a RF amplifier 500 employing both half- and full-bridge switch modules with current sources, in accordance with an embodiment of this disclosure. In this embodiment, full-bridge switch modules 505 and half-bridge switch modules 510 are connected in parallel fashion, as in FIGS. 3A and 3B. In the embodiment shown in FIG. 5, each full-bridge switch module 505 includes four switching devices 520 electrically interconnected in a full-bridge circuit and electrically connected with a DC current source 515. Each half-bridge switch module 510 includes two switching devices 520 electrically connected in a half-bridge circuit and electrically connected with a DC current source 515. An output filter 525 (e.g., a low-pass or band-pass filter) is electrically connected between the output terminals of RF amplifier 500 and load 530. As in the other embodiments discussed above, a control circuit 535 controls the switching (state changes) of switching devices 520 to change the current produced by each switch module 505 or 510 as needed during operation. Though, for simplicity, FIG. 5 shows no connections between control circuit 535 and the switching devices 520, there are, in reality, control lines connecting control circuit 535 with the gates of the respective switching devices 520 (e.g., MOSFET or GaN HEMT devices). Each switching device 520 has an associated "off" state and an associated "on" state.

Figure 6:
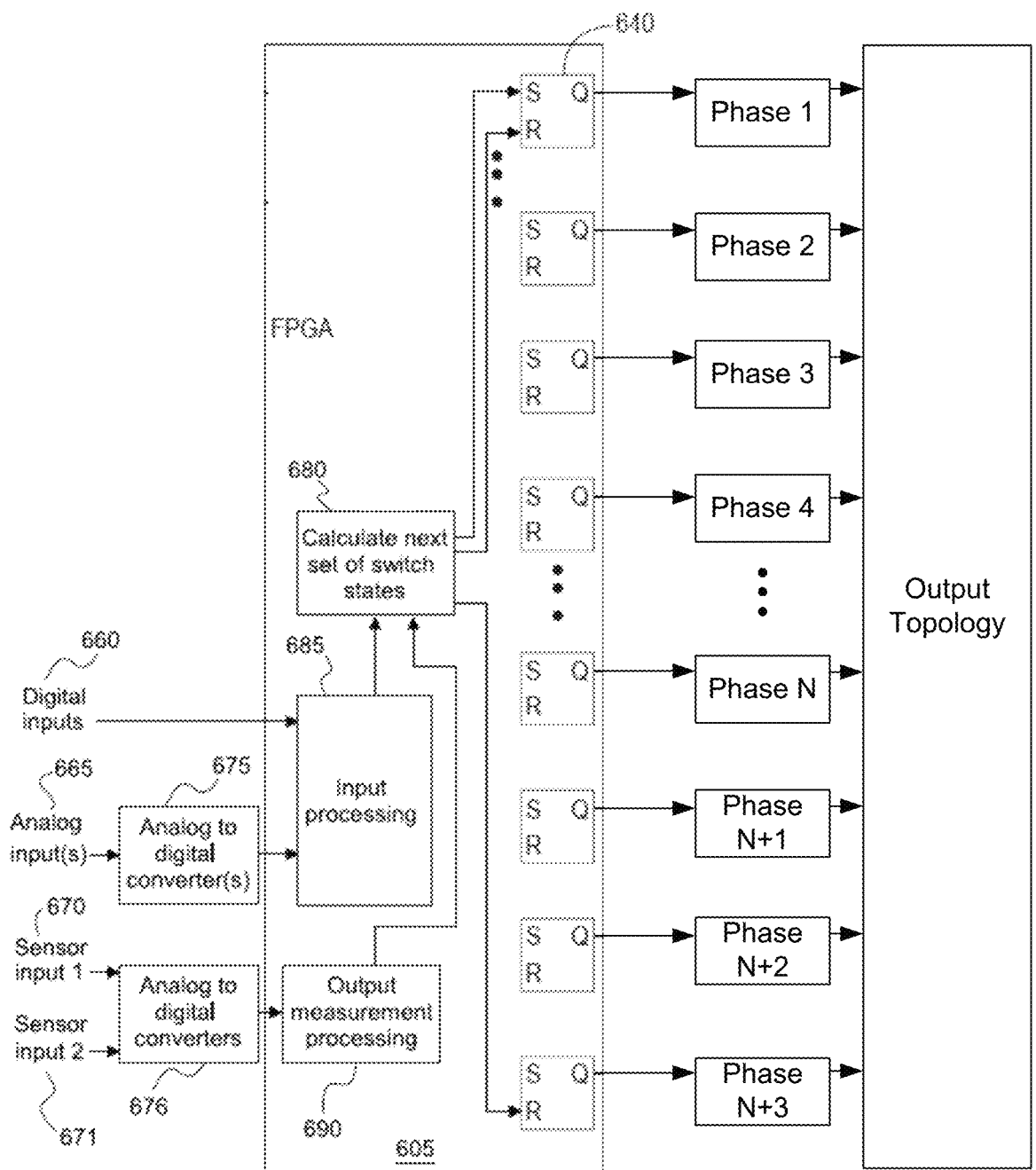
FIG. 6 is a schematic diagram of a control circuit in accordance with an embodiment of this disclosure.

FIG. 6 is a schematic diagram of a control circuit 600 in accordance with an embodiment of this disclosure. FIG. 6 illustrates an architecture for implementing a control circuit such as control circuits 230, 330, 435, or 535 discussed above in connection with FIGS. 2A, 3A, 4, and 5, respectively.

The embodiment in FIG. 6 implements the switching logic as a field-programmable gate array (FPGA) 605. FPGA 605 includes logic for deciding which switching devices (210, 310, 420, 520) need to be turned on and which need to be turned off at a given switching interval. To calculate the required switch states, the FPGA receives inputs about the desired output. This can take the form of digital inputs 660 or analog inputs 665 processed by an analog-to-digital converter 675. The desired output can be a waveform as a function of time, be it load voltage, load current, or a combination of load voltage and current; or a desired characteristic of power delivered to the load such as RMS load voltage or current, delivered power, or forward power. Inputs are processed by input processing element 685. The actual output is measured with a sensor (not shown), and the sensor outputs 670 and 671 are converted to digital signals with analog-to-digital converters before being processed by element 690. Sensor outputs 670 and 671 can be load voltage and current or combinations thereof such as forward voltage or reflected voltage or forward, reflected, or delivered load power. Decisions about the next switch state are made with element 680 based on the required and actual outputs, as determined in elements 685 and 690. Elements 680, 685, and 690 can be combined or split in various ways and can be implemented using synchronous or asynchronous logic or software executed in the FPGA or with the aid of an external microprocessor or digital signal processor. In FIG. 6, an "off" pulse 615 and an "on" pulse 620 are conveyed to the gates of the switching devices via control lines 625 through suitable isolation circuitry (not shown in FIG. 6) such as transformers or optical isolators. Control circuit 600 also includes a set of switches 630. In FIG. 6, the FPGA 605 outputs are represented as the outputs of a set of SR latches or flip flops 640. Those outputs are connected with the gates of a set of transistors 645, in some instances through an inverter 650. Control circuit 600 further includes a delay element 655 to create a timing offset between "off" pulses 615 and "on" pulses "620."

To turn a particular switching device (210, 310, 420, 520) on, the turning-on circuitry in control circuit 600 is pulsed. To turn a particular switching device off, the turning-off circuitry in control circuit 600 is pulsed (i.e., an opposing pulse is generated). It is important to note that, in cascaded-voltage-source embodiments such as those discussed above in connection with FIGS. 2A and 4, the opposing switching device must always be turned off first before the next switching device is turned on. For parallel-current-source embodiments such as those discussed above in connection with FIGS. 3A and 5, just the opposite is true: current needs to be turned on in the next switching device before current is turned off in the opposing device.

Direct digital synthesizer (DDS) 610 provides a clock signal for control circuit 600. DDS 610 could be any kind of oscillator, but it is advantageous to use a variable-frequency generator. Clock synchronization is handled by clock synchronization element 635. If all switching devices (210, 310, 420, 520) in the switch modules (205, 305, 405, 410, 505, 510) are switched at the DDS clock rate regardless of whether the state of a given switch module changes on the clock edge, two control lines 625 are required per full-bridge switch module. For example, for a design that includes 28 full-bridge switch modules, 56 FPGA control outputs would be needed. The timing from the FPGA is not critical, so long as the states of the control lines are set within the smallest DDS clock period of 13.9 ns, in this embodiment. If control pulses are issued only when necessary to change or maintain the state of a full-bridge switch module, four outputs per full-bridge switch module are required, meaning the above-mentioned embodiment that includes 28 full-bridge switch modules would require 112 control lines 625. Locking the switching clock to the output frequency dramatically lowers residual amplitude modulation and produces a much cleaner spectrum.

The following detailed descriptions of embodiments of systems and methods to achieve current balancing and avoid back-to-back switching (or multiple switching events for a given phase within a single pulse-width modulated cycle or other threshold period of time) can be implemented in the systems and methods described above relative to FIGS. 1-6.

With an N-phase design, there are $2^N$ possible switch states which produce a total of N+1 discrete voltage levels. This means that for most voltage levels there are many switch state configurations for the N phases that achieve the same output voltage level, and thus any of these can be chosen given the same control signal. Thus, these extra or redundant switch state configurations can be chosen from to also achieve enhanced current balancing across the phases. When the number of switches intended to be in the on-state increases, to achieve an increased output level, the phase currents of the next two phases to be switched on are compared. If the phase current balance would be improved by delaying turning on the next of these two switches, the firing order of the two phases can be swapped (i.e. the two rows of matrix M are swapped). A similar operation can be performed when the number of switches required to be in the off-state increases. After a disturbance, the method quickly settles into a new stable firing order with balanced phase currents. In this way, swapping firing orders for switches that are to be switched on or off in near succession can help to even out or balance currents between the N phases. One advantage off there herein disclosed phase current balancing is the avoidance of picosecond timing and avoidance of any disturbance on the output resulting from balancing efforts.

At the same time, when the above-noted current-balancing technique looks to phases that have been on for the longest periods, or off for the longest periods, then back-to-back switching, or multiple switching events for a given phase within a single pulse-width modulated cycle or other threshold period of time, can also be avoided. Since such rapid switching can lead to excessive switch (e.g., transistor) heat and thus reduced device lifetime, avoiding rapid switching helps to lengthen device life expectancy.

Figure 7:
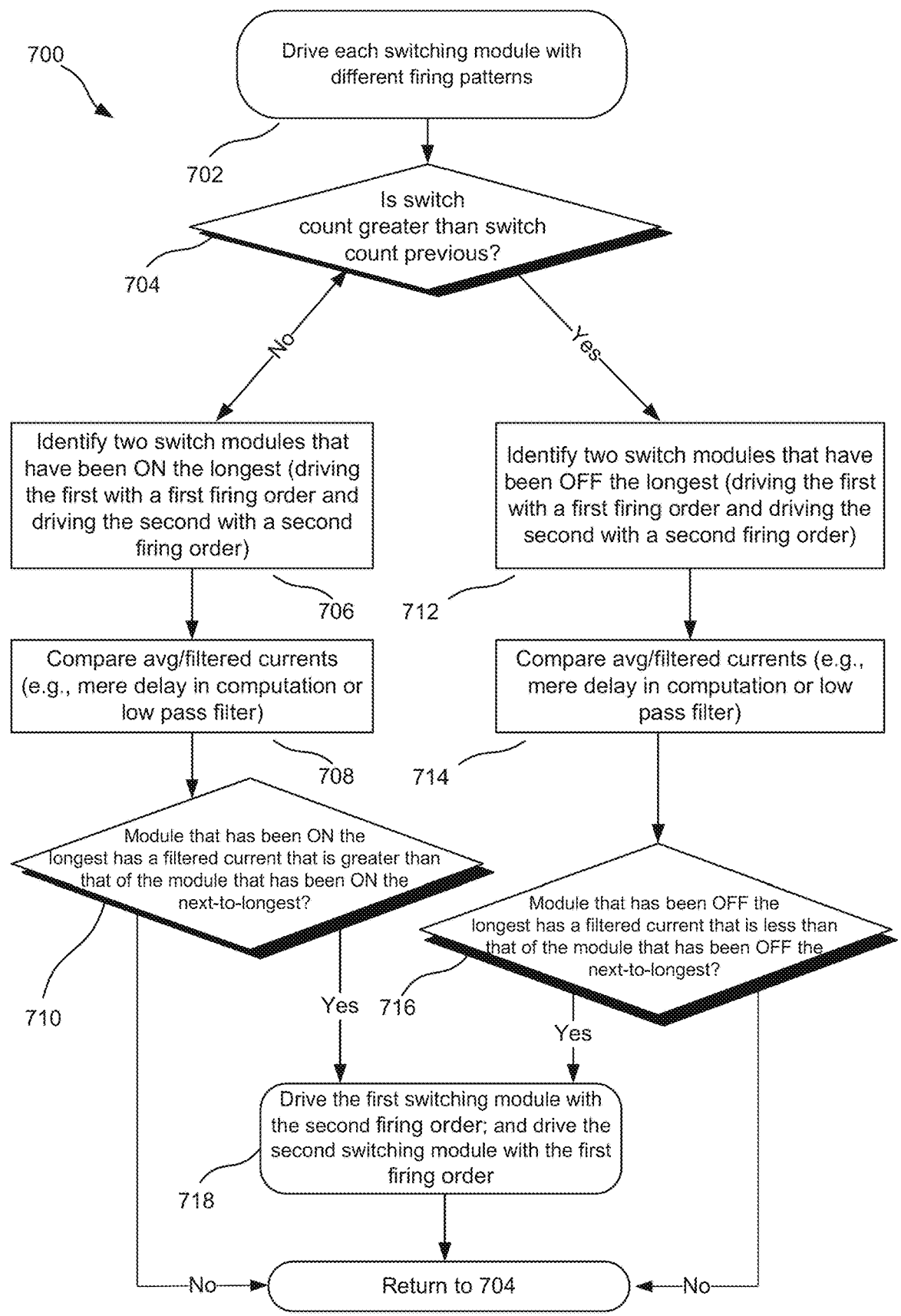
FIG. 7 illustrates a method of phase current balancing.

FIG. 7 illustrates a method of phase current balancing. This method 700 can be applied to a controller and pulse-width modulation section of a power conversion device, such as 1004, 1006, 1104, and 1106 in FIGS. 10 and 11. The controller and pulse-width modulation section can be configured to receive a control level or waveform at an input and generate switching signals for a plurality of interleaved switching modules or phases. A summarized output of the phases achieves a filtered output corresponding to the control level or waveform. The method 700 can include driving each switching module or phase with different firing patterns (Block 702). To achieve current balancing, firing orders of certain phases can be swapped where a current imbalance is seen between two or more phase outputs. In other words, the method 700 can determine if swapping firing orders between two of the phases or interleaved switching modules will reduce a current imbalance from outputs of these two phases, and if so, then switching the firing patterns of these two phases.

More specifically, the method 700 can determine if a next switching cycle will increase or decrease the "on" switch count (i.e., if the control level or waveform calls for a larger or smaller output) (Decision 704).

For an increase in on switches (Decision 704=yes), the method 700 can identify two phases that have been off the longest (Block 712). For instance, a first phase that has been off for a longest time may be identified, and it may be noted that this phase is driven by a first firing order. A second phase that has been off for a second longest time may also be identified, and it may be noted that this phase is driven by a second firing order. A filtered current from the two phases can be compared (Block 714) and if the first phase has a smaller filtered output current than the second phase (Decision 716=yes), then the firing patterns for these two phases can be swapped (i.e., driving the first phase with the second firing order and driving the second phase with the first firing order) (Block 718). If the first phase has a larger filtered output current than the second phase, then the firing patterns for these two phases can remain the same (Decision 716=no) and the method 700 can return to Decision 704.

For a decrease in on switches (Decision 704=no), the method 700 can identify two phases that have been on the longest (Block 706). For instance, a first phase that has been on for a longest time may be identified, and it may be noted that this phase is driven by a first firing order. A second phase that has been on for a second longest time may also be identified, and it may be noted that this phase is driven by a second firing order. A filtered current from the two phases can be compared (Block 708) and if the first phase has a larger filtered output current than the second phase (Decision 710=yes), then the firing patterns for these two phases can be swapped (i.e., driving the first phase with the second firing order and driving the second phase with the first firing order) (Block 718). If the first phase has a smaller filtered output current than the second phase, then the firing patterns for these two phases can remain the same (Decision 710=no) and the method 700 can return to Decision 704.

Each phase or switching module can include a pair of switches in a half or full-bridge configuration as shown, for example, in FIGS. 3 and 5. Each phase or switching module can include outputs that are summed to provide a summarized output from the power conversion device, such as the summarized output 1005 and 1105 seen in FIGS. 10 and 11, respectively. In some embodiments, an inductive component, such as an inductor, can be arranged between an output of each phase and the summarized output (e.g., see FIGS. 15-18). In some embodiments, current through the inductor is measured and this feedback is provided to the control section or controller (e.g., controllers 1004 and 1104). In an embodiment, the control section or controller can look at a sum of currents in all phases. In some embodiments, a tolerance value can be considered when comparing filtered outputs to determine whether to swap firing patterns for two phases. For instance, rather than merely asking whether one filtered current is larger than another, the controller 1104 may ask whether a first filtered current exceeds a second filtered current by at least a tolerance value (e.g., tolerance is a difference in measured current between two phases that is allowed before the decision to swap their firing order is made).

Figure 15:
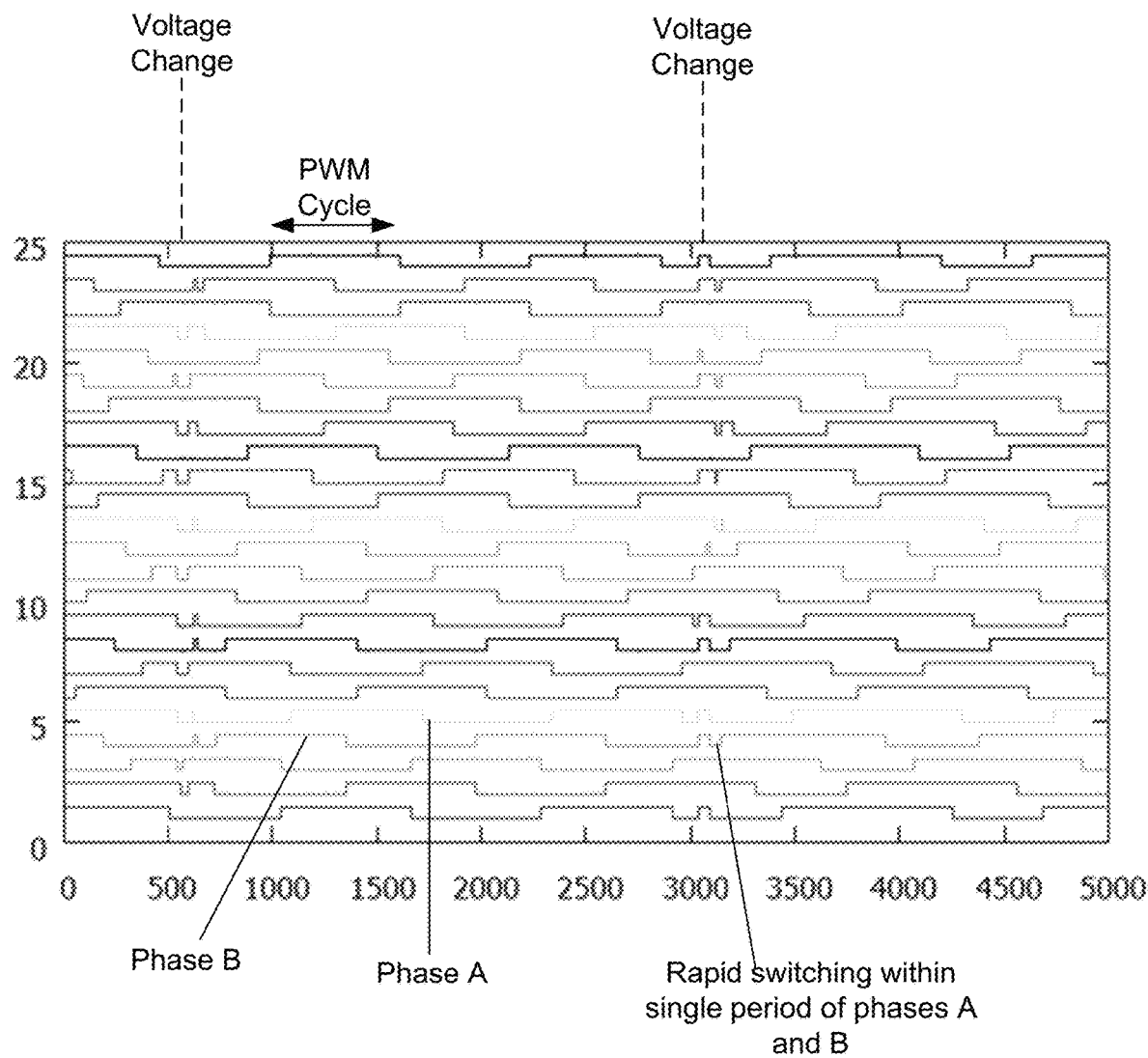
FIG. 15 shows a firing order to achieve the voltage changes seen in FIG. 16.
Figure 17:
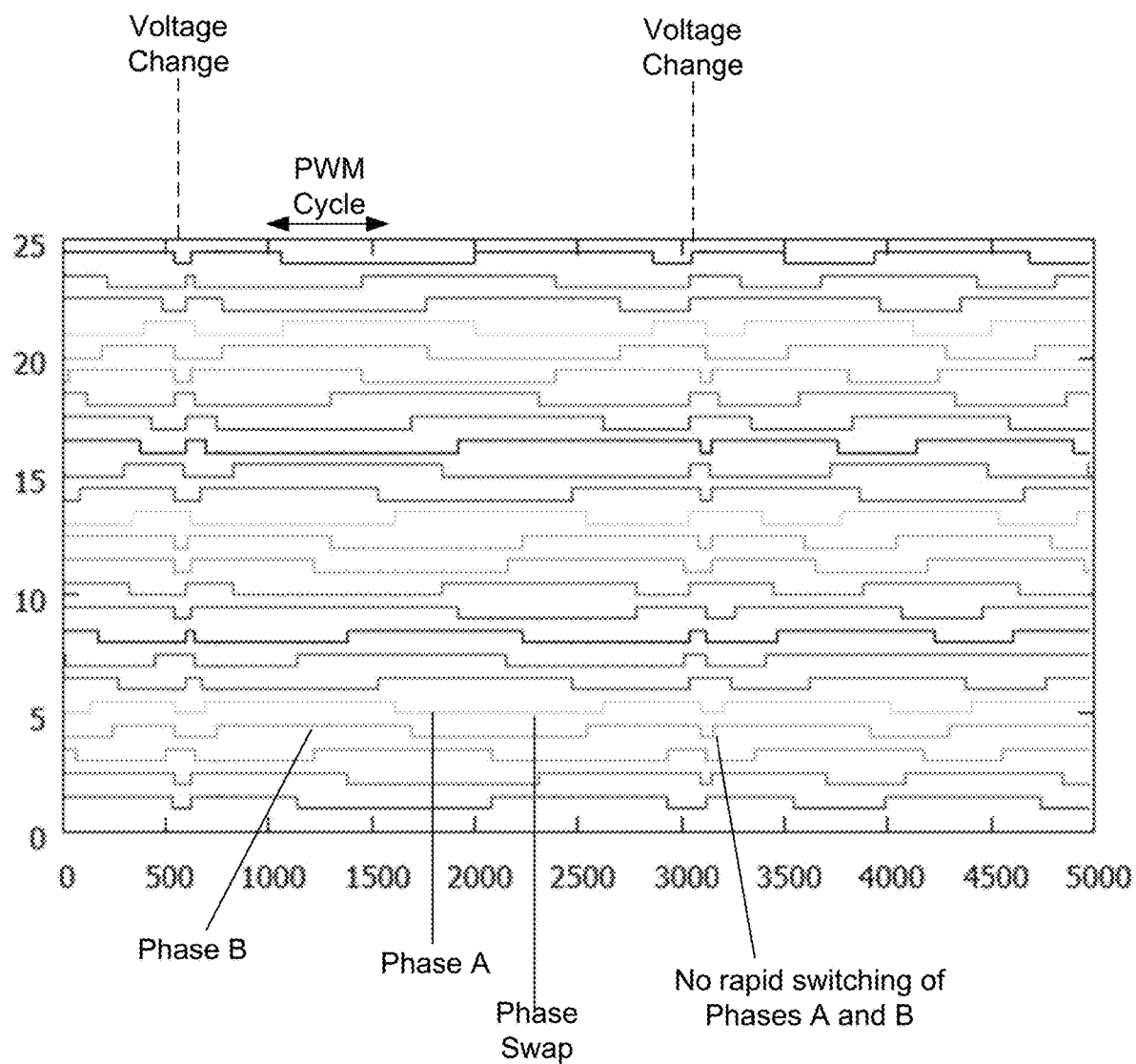
FIG. 17 shows a novel firing order to achieve the voltage changes seen in FIG. 16.

While current balancing can be achieved by merely swapping firing patterns for any two phases, the herein disclosed systems and methods can also enhance switching device lifetime by avoiding multiple switching events for a given phase within a single pulse-width modulated cycle or other threshold period of time. This is achieved by performing the current balancing pattern swapping on two phases that have been on or off for the longest and next-to-longest, respectively, periods of time. FIGS. 15 and 17 helps to show how the swapping of firing orders for switches that have been on the longest or off the longest can avoid multiple switching events for a given phase within a single pulse-width modulated cycle or other threshold period of time. In particular, FIG. 15 shows a number of phases including Phase A and B, where upon the second voltage change, phases A and B see multiple switching events within a single cycle. In FIG. 17, the firing order of phases A and B is swapped around time 2300, such that the second voltage change is brought about by a single switching event for both Phases A and B.

Figure 8:
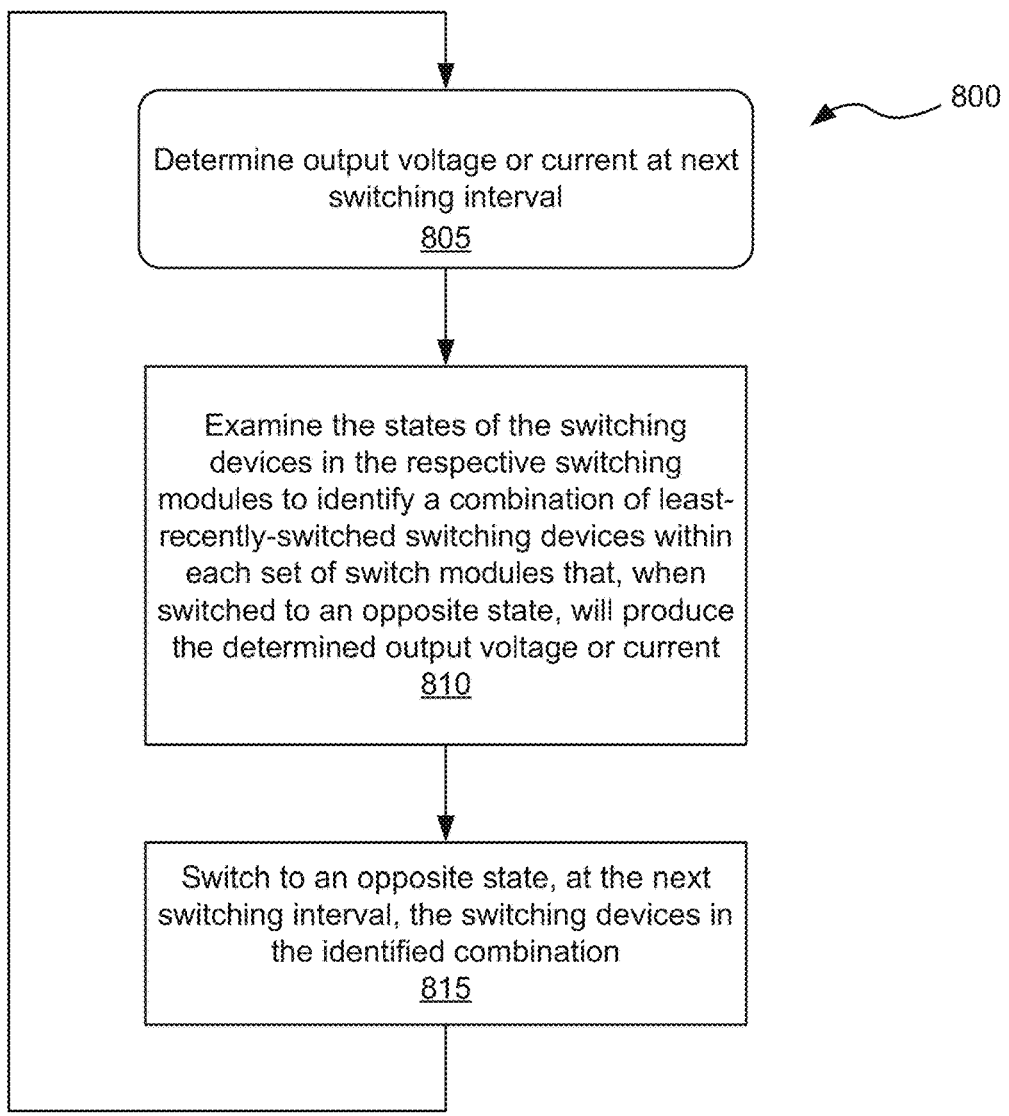
FIG. 8 illustrates another method to achieve current balancing.

FIG. 8 illustrates another method to achieve current balancing. The method 800 starts by determining an output voltage or current at a next switching interval (Block 805). The method 800 then examines states of the switching devices, or phases, in the respective switching modules to identify a combination of least-recently-switched switching devices within each set of phases that, when switched to an opposite state, will produce the determined output voltage or current (Block 810). The method 800 then switches to an opposite state, at the next switching interval, the phases in the identified combination (Block 815).

Figure 9:
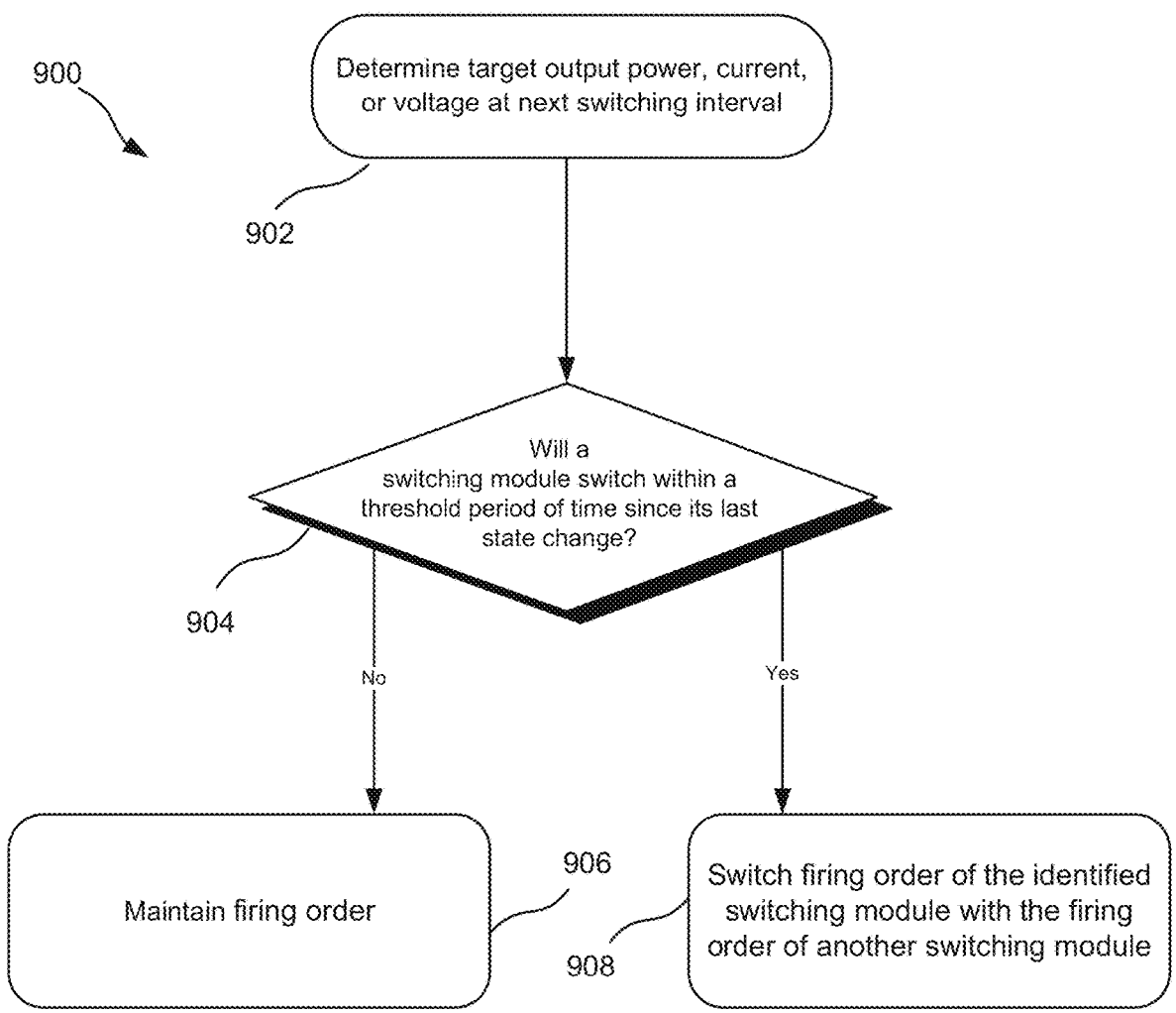
FIG. 9 illustrates another method to avoid rapid switching of phases.

FIG. 9 illustrates another method to avoid rapid switching of phases. This method 900 can be operated in concert with efforts to balance current between phases, or in isolation. The method 900 starts by determining a target output power, current, or voltage at a next switching interval (e.g., via a control level or waveform) (Block 902). Next, the method 900 determines if a phase is expected to be switched within a threshold period of time (e.g., a PWM cycle) since its last state change (Decision 904). If so, then the method 900 can switch the firing order of the identified phase with the firing order of another phase (Block 908), and if not, the method 900 can leave the firing order of the identified phase as is (Block 906). Either way, the method 900 can be repeated for all phases and can periodically or continually repeat.

In an embodiment, having a fixed pulse width modulation period allows analog to digital conversion sampling to be precisely synchronized with the pulse-width modulation. This can allow better performance by not requiring anti-aliasing filters for switching frequency ripple and perhaps also allow the use of cheaper analog-to-digital converters.

Figure 10:
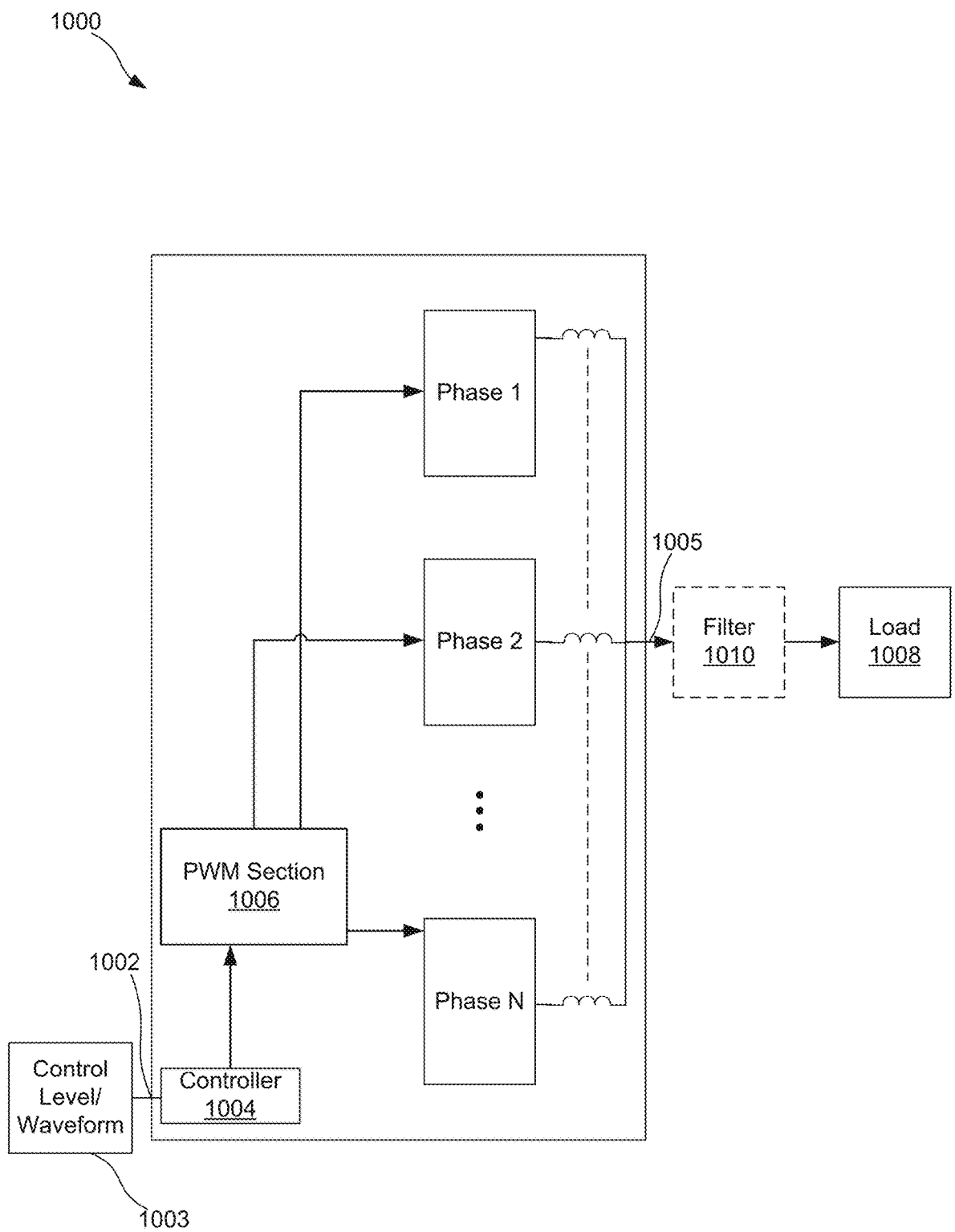
FIG. 10 illustrates an embodiment of a power conversion system that reduces current imbalance between phases and reduces rapid switching of phases.

FIG. 10 illustrates an embodiment of a power conversion system that reduces current imbalance between phases and reduces rapid switching of phases (i.e., to select firing orders configured to avoid multiple switching events for a given phase within a single pulse-width modulated cycle or other threshold period of time). The power conversion system 1000 can be implemented as a multi-phase switching converter in one embodiment. The power conversion system 1000 can include an input 1002 configured to receive a control level or control waveform 1003 (e.g., a control signal or indication of a desired output voltage) and provide the desired output to a controller 1004. The controller 1004 can provide a control signal to a pulse-width modulation section 1006 that controls switching of N phases whose outputs are combined at a summarized output 1005. The controller 1004 is configured to receive the control level or waveform and control or drive N phases of the power conversion device 1000 (e.g., via switching signals), via the pulse-width modulation section 1006, where the phases (or interleaved switching modules) are coupled in parallel and are summarized at the output 1005. The output 1005 can be provided to a load 1008 via an optional filter 1010. Each of the N phases can be coupled to the output 1005 via inductors that are coupled to each other, although coupling of the inductors is not required.

The controller 1004 can adjust a firing sequence of the N phases to achieve a summarized output that (1) corresponds to the control level or waveform 1003, (2) reduces current imbalances between the N phases, and (3) avoids or reduces multiple switching events for a given phase within a single pulse-width modulated cycle or other threshold period of time. To do this, the pulse-width modulation section 1006 (e.g., via the controller 1004) can be configured to determine if a next switching cycle will involve a change in the summarized output, and hence if an increase or decrease in a number of phases that are on is expected (e.g., Decision 704 in FIG. 7). If so, the pulse-width modulation section 1006 can select firing orders for each of the N phases, from among those patterns that will achieve the desired summarized output, that reduces current imbalances between the N phases (e.g., Block 718 in FIG. 7). For instance, the pulse-width modulation section 1006 can identify whether the next switching cycle will involve an increase or decrease in a number of phases that are switched on (i.e., whether the control level/waveform 1003 increases or decreases), and if more phases are to be switched on, then identify the two phases that have been off the longest (e.g., Block 712 in FIG. 7), and if swapping their firing patterns would improve current balance (e.g., Decision 716 in FIG. 7), then swapping their firing patterns (e.g., Block 718 in FIG. 7), and if fewer phases are to be switched on, then identify the two phases that have been on the longest (e.g., Block 706 in FIG. 7), and if swapping their firing patterns would improve current balance (e.g., Decision 710 in FIG. 7), than swapping their firing patterns (e.g., Block 718 in FIG. 7). More specifically, where more switches are to be turned on, the two phases that have been off the longest can be identified, and a filtered output current for each can be compared. If the one of these two phases that has been off the longest has a filtered output current greater than the phase that has been off the next-longest, then the firing patterns of these two phases can be swapped. Where more switches are to be turned off than those to be turned on, the two phases that have been on the longest can be identified, and a filtered output current for each can be compared. If the one of these two phases that has been on the longest has a filtered output current greater than that of the phase that has been on the next-longest, then the firing patterns of these two phases can be swapped. This not only helps to balance currents between the phases, but also helps reduce instances of rapid switching of a given phase.

Although this description has suggested looking at the two phases that have been on or off for the longest and next-longest periods of time, the method also works for other than those phases, though the benefits begin to diminish if one moves too far away from the longest and next-longest phases.

The phases shown in FIG. 10 can be interleaved switching modules, such as those shown in FIGS. 2-6.

Figure 11:
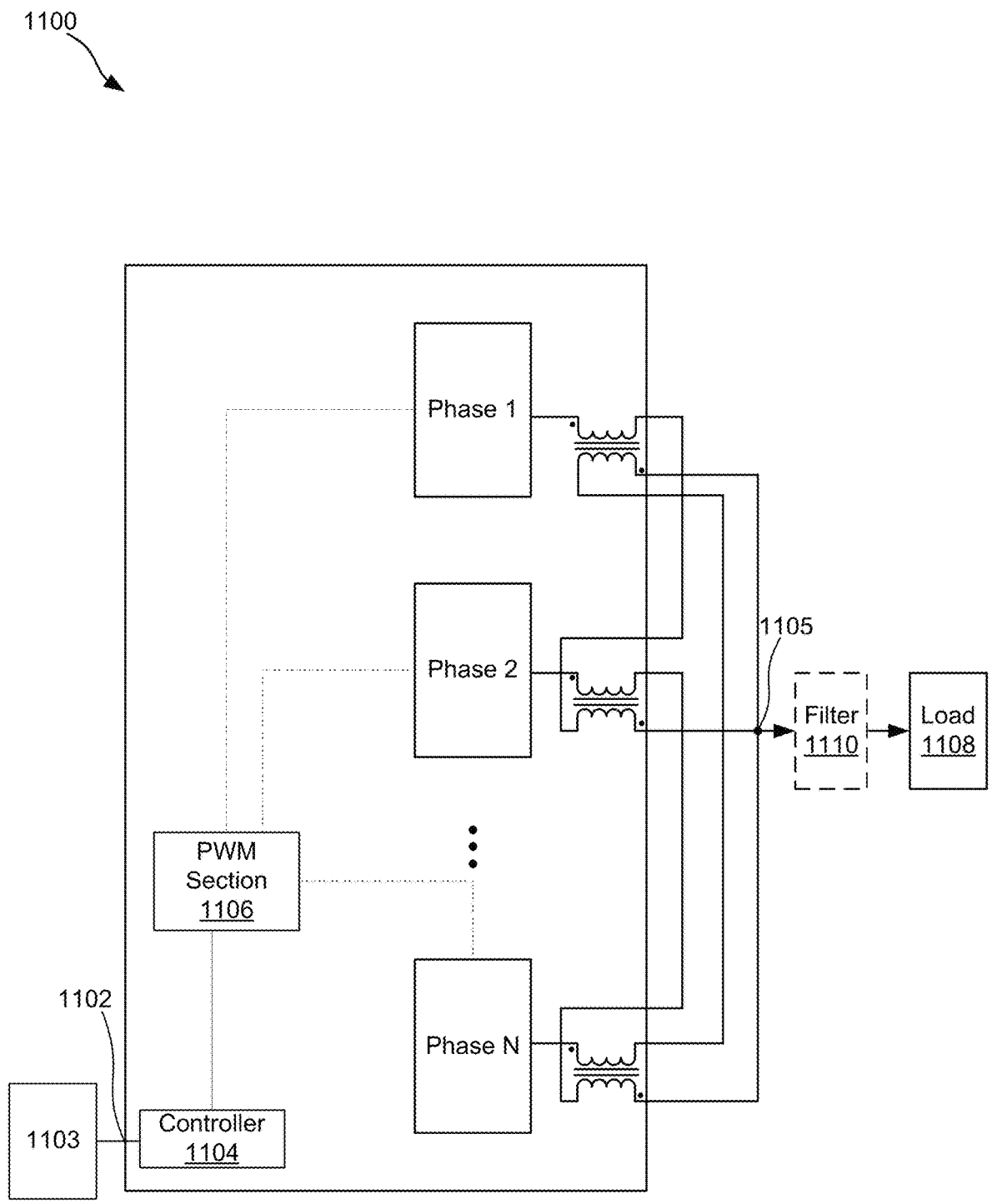
FIG. 11 shows an alternative topology where transformers replace the coupled inductors of FIG. 10.

FIG. 11 shows an alternative topology where transformers replace the coupled inductors of FIG. 10.

Figure 12:
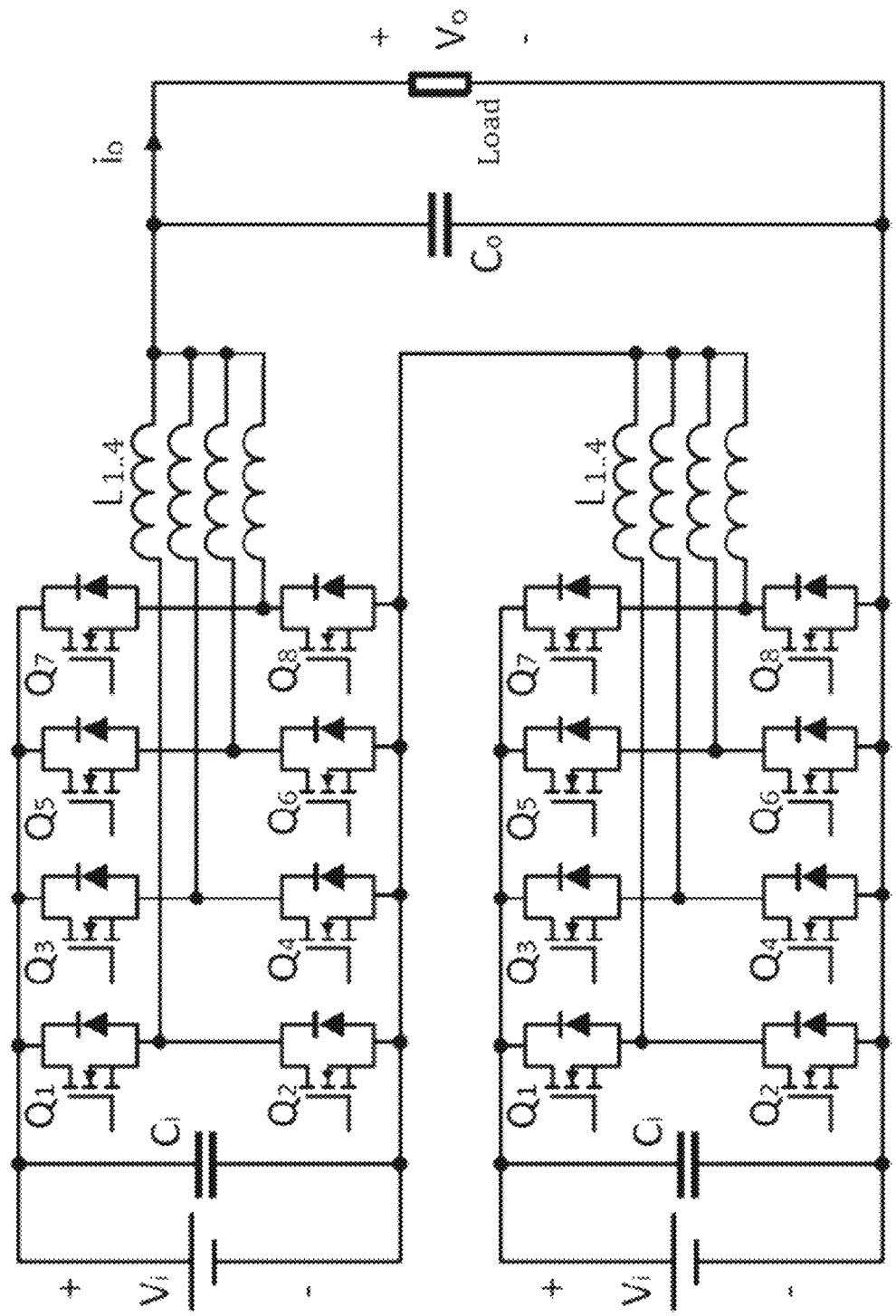
FIG. 12 illustrates a variation of the topologies seen in FIGS. 10 and 11.

FIG. 12 illustrates a variation of the topologies seen in FIGS. 10 and 11. In this embodiment each of 8 phases are organized into two modules, each module having four phases and a single power supply. The phases within a module are coupled in parallel and their outputs are provided in parallel through respective inductors $L_{1 \ldots 4}$. The two modules are coupled in series to provide a summarized output, $i_0$ and $V_0$ to a load. By coupling the modules in series, both modules provide the same output current, and thus this topology helps to further reduce current imbalances between phases. However, the phases within a module can still see current imbalances at the output inductors, and thus the methods described above for balancing current are still applicable relative to the phases within the two modules shown in FIG. 12. One will appreciate that this is an illustrative example only and any number of modules, each having any number of half- or full-bridge phases, can be implemented.

This disclosure has discussed filtered outputs, which could result from a natural delay due to finite computation time, low-pass filtering, or an averaging filter.

Figure 13A:
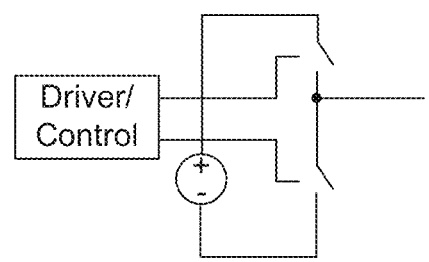
FIG. 13A illustrates a first example of details of the phases shown and discussed throughout this application.
Figure 13B:
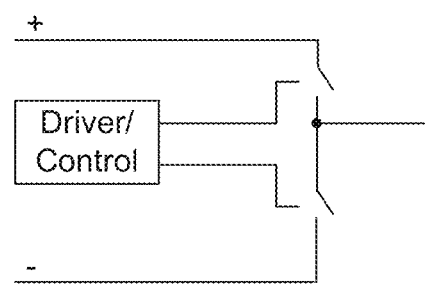
FIG. 13B illustrates a second example of details of the phases shown and discussed throughout this application.

FIG. 13A and FIG. 13B illustrate examples of details of the phases shown and discussed throughout this application. Both of these examples show half-bridge topologies, but full-bridge topologies are equally applicable. FIG. 13A shows an embodiment where a pair of switches is powered by a single power source, and thus each phase has its own power source. FIG. 13B shows an embodiment where a common rail provides a bus voltage to each phase and thus only a single power source is used for any number of phases.

Figure 14:
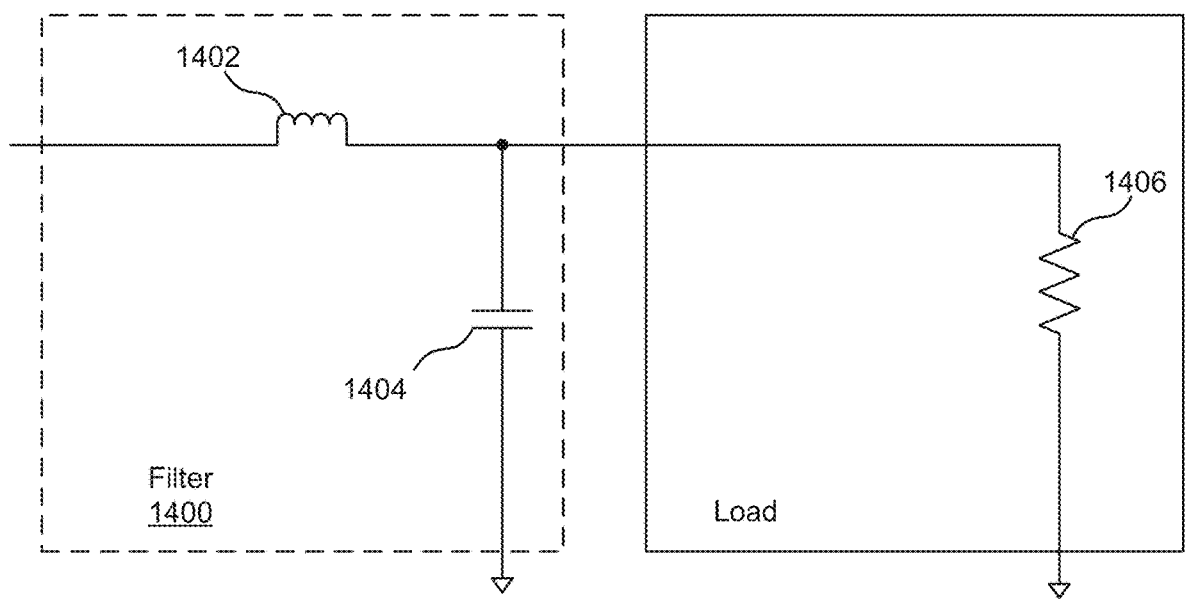
FIG. 14 illustrates a non-limiting example of the filters in FIGS. 10 and 11

FIG. 14 illustrates a non-limiting example of the filter 1010 and 1110 in FIGS. 10 and 11.

Figure 16:
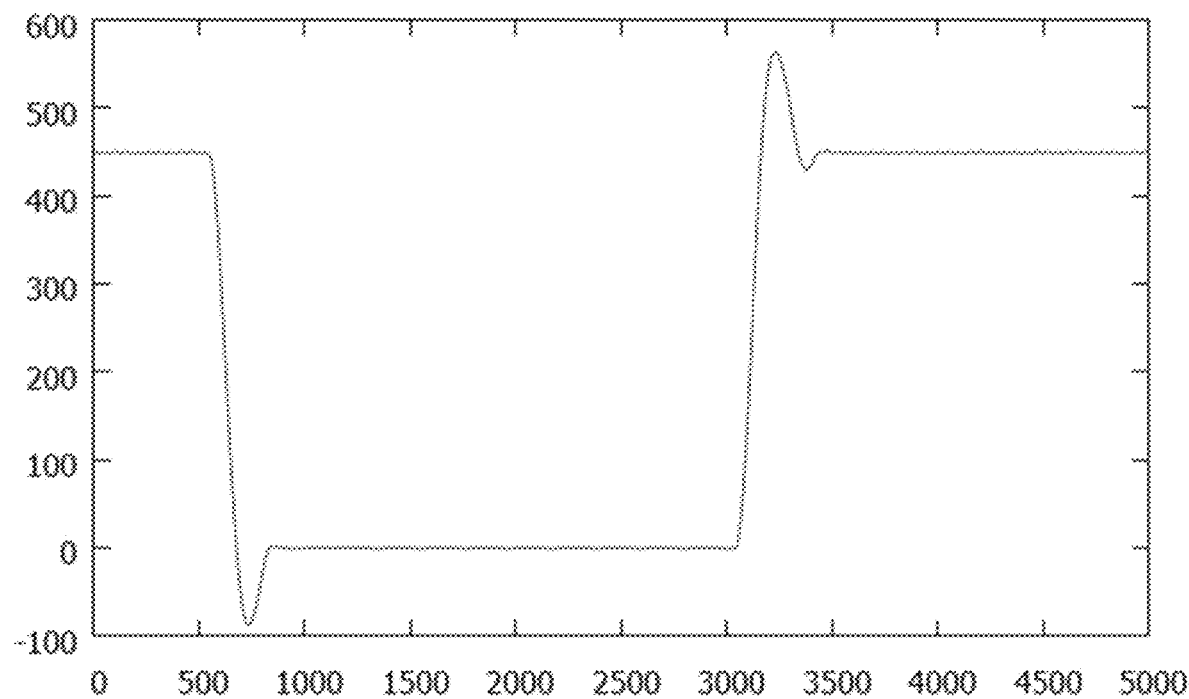
FIG. 16 shows an exemplary output voltage plot resulting from the traditional switching regime shown in FIG. 15 as well as the novel switching regime of FIG. 17.

FIG. 15 shows a traditional firing order to achieve the voltage changes seen in FIG. 16.

FIG. 17 shows a novel firing order to also achieve the voltage changes seen in FIG. 16, but using the herein-disclosed embodiments to avoid multiple switching events for a given switch within the same pulse-width modulated cycle. At any given time, the two firing orders seen in FIGS. 15 and 17 achieve the same voltage output (although the herein-disclosed embodiments as exemplified by the plot in FIG. 17 would produce lower transients), but FIG. 17 does so while avoiding multiple switching events for a given switch within the same pulse-width modulated cycle. As one can see, FIG. 17 also sees many of the switches undergo a switching event at around times 600 and 3100, but unlike FIG. 15, a second switching event within the same pulse-width modulated cycle is not seen.

Figure 18:
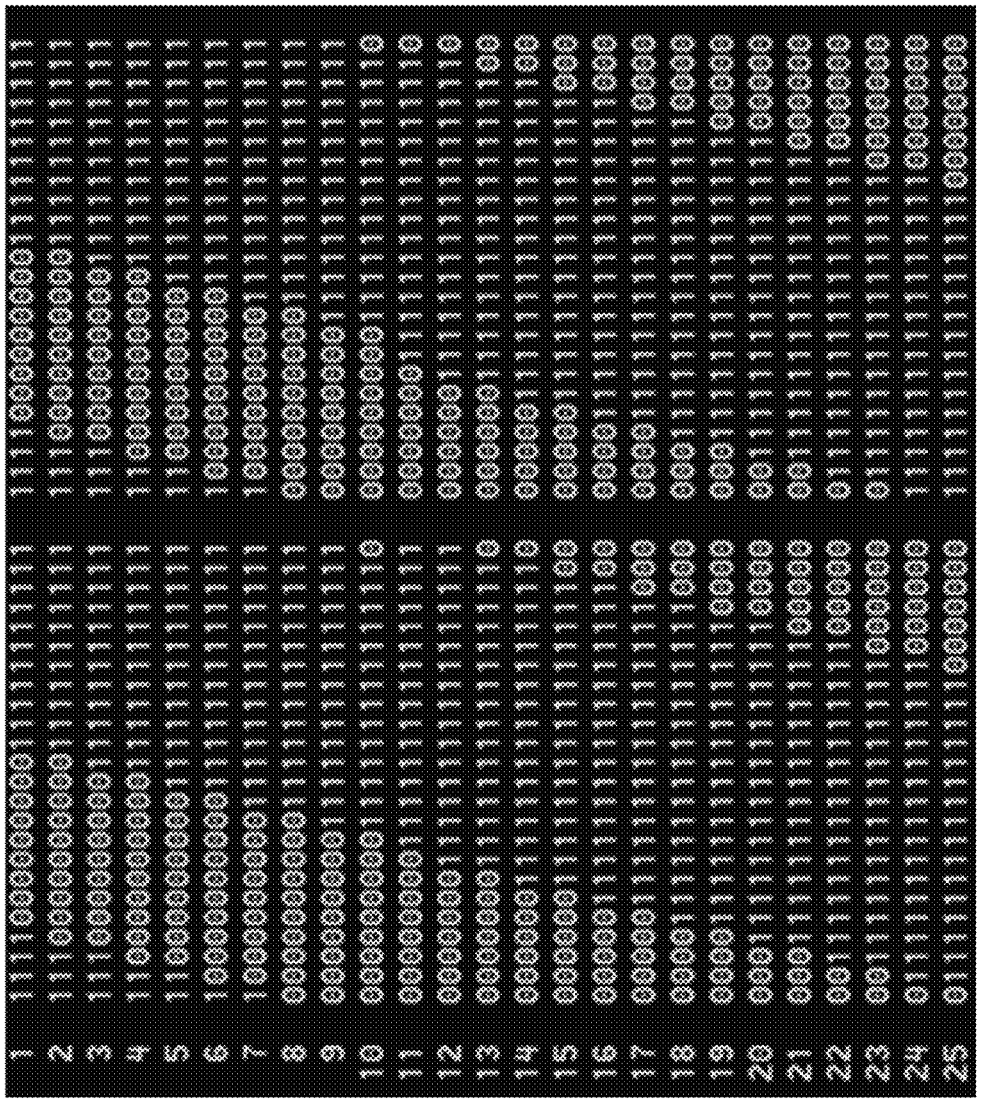
FIG. 18 illustrates a side-by-side comparison of a digital control for a multiphase buck converter.

FIG. 18 illustrates a side by side comparison of a digital control for a multiphase buck converter. On the left is a traditional fixed-phase firing order where switches are switched in a consecutive fashion until a voltage change is desired (e.g., at line 11). For a given desired voltage, the same number of switches are driven to the on and off states at various times. When a voltage change is desired at line 11, the number of off switches ("0") increases by one. To achieve this, the switch to the furthest right switches back to on or "1" at line 11 rather than continuing to stay off, which results in a back-to-back switching of on to off to on between lines 9 and 11. This is the rapid back-to-back type switching that the current disclosure seeks to avoid.

On the right is a firing order achieving the same voltage change at line 11, but using there herein disclosed firing sequence, where two longest on or longest off switches have their firing patterns swapped thereby avoiding back-to-back switching of the switch driven by the signal at the furthest right column. Specifically, the firing sequence at line 10 is the same with the rightmost bit (or control signal for the corresponding switch) switched off, but at line 11, the switches that turn on are effectively shifted one switch to the left as compared to the traditional firing sequence seen in line 11 at the right. In other words, instead of switching the rightmost bit back to on, the proposed switching method seen on the right turns on the two switches that have been off the longest (i.e., the $8^{th}$ and $9^{th}$ switches). Further, each subsequent line of switching is based on the new firing sequence of line 11.

Figure 19:
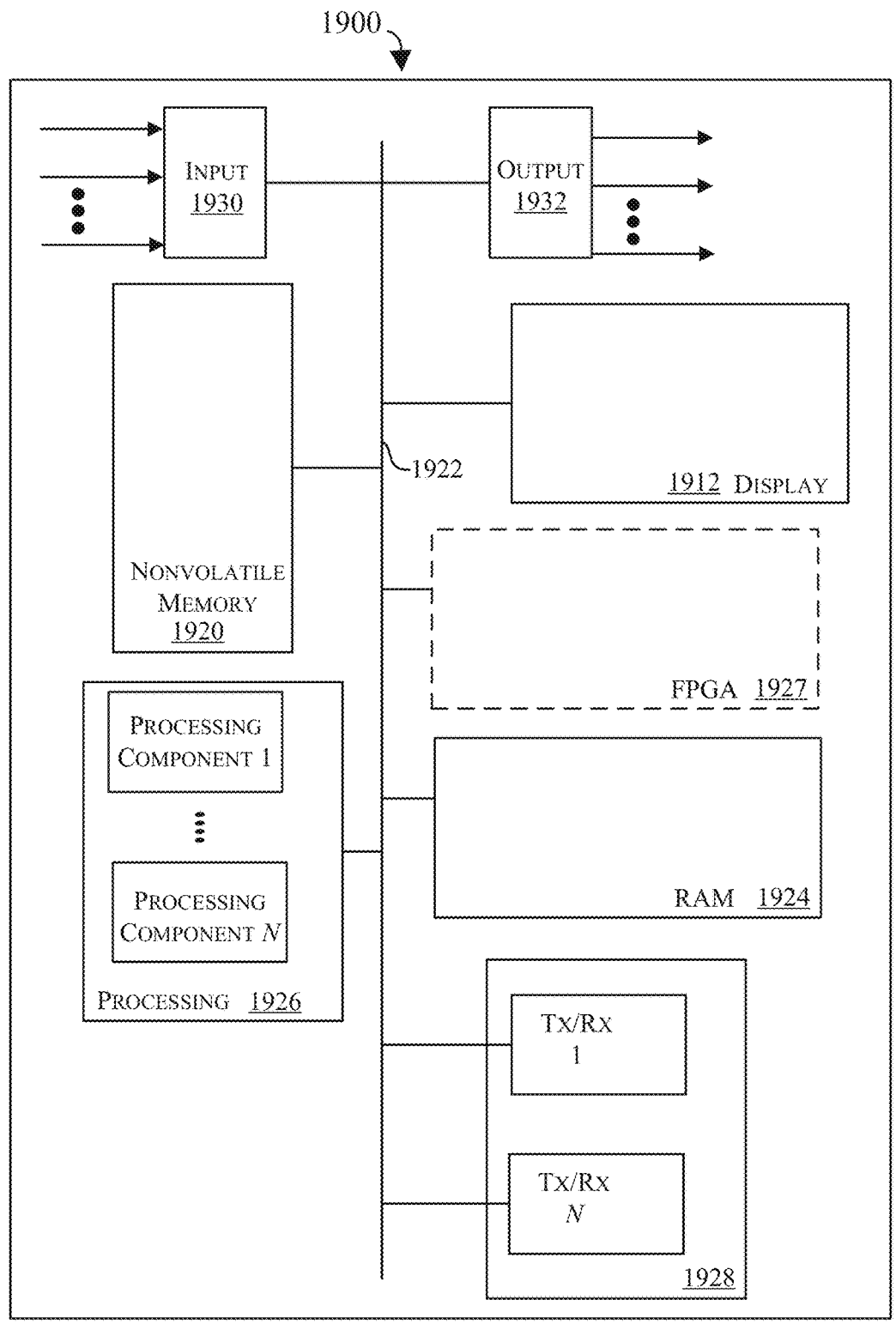
FIG. 19 shows a block diagram depicting physical components that may be utilized to realize the controllers seen in FIGS. 10 and 11, according to an exemplary embodiment

The methods described in connection with the embodiments disclosed herein may be embodied directly in hardware, in processor-executable code encoded in a non-transitory tangible processor readable storage medium, or in a combination of the two. Referring to FIG. 19 for example, shown is a block diagram depicting physical components that may be utilized to realize the controllers seen in FIGS. 10 and 11 according to an exemplary embodiment. As shown, in this embodiment a display portion 1912 and nonvolatile memory 1920 are coupled to a bus 1922 that is also coupled to random access memory ("RAM") 1924, a processing portion (which includes N processing components) 1926, an optional field programmable gate array (FPGA) 1927, and a transceiver component 1928 that includes N transceivers. Although the components depicted in FIG. 19 represent physical components, FIG. 19 is not intended to be a detailed hardware diagram; thus many of the components depicted in FIG. 19 may be realized by common constructs or distributed among additional physical components. Moreover, it is contemplated that other existing and yet-to-be developed physical components and architectures may be utilized to implement the functional components described with reference to FIG. 19.

This display portion 1912 generally operates to provide a user interface for a user, and in several implementations, the display is realized by a touchscreen display. In general, the nonvolatile memory 1920 is non-transitory memory that functions to store (e.g., persistently store) data and processor-executable code (including executable code that is associated with effectuating the methods described herein). In some embodiments for example, the nonvolatile memory 1920 includes bootloader code, operating system code, file system code, and non-transitory processor-executable code to facilitate the execution of a method described with reference to FIGS. 7-9 described further herein.

In many implementations, the nonvolatile memory 1920 is realized by flash memory (e.g., NAND or ONENAND memory), but it is contemplated that other memory types may be utilized as well. Although it may be possible to execute the code from the nonvolatile memory 1920, the executable code in the nonvolatile memory is typically loaded into RAM 1924 and executed by one or more of the N processing components in the processing portion 1926.

The N processing components in connection with RAM 1924 generally operate to execute the instructions stored in nonvolatile memory 1920 to enable variations in firing patterns to alleviate current imbalances between phases in a multi-phase converter and to reduce rapid switching of particular phases. For example, non-transitory, processor-executable code to effectuate the methods described with reference to FIGS. 7-9 may be persistently stored in nonvolatile memory 1920 and executed by the N processing components in connection with RAM 1924. As one of ordinarily skill in the art will appreciate, the processing portion 1926 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1926 may be configured to effectuate one or more aspects of the methodologies described herein (e.g., the method described with reference to FIGS. 7-9). For example, non-transitory processor-readable instructions may be stored in the nonvolatile memory 1920 or in RAM 1924 and when executed on the processing portion 1926, cause the processing portion 1926 to vary firing patterns to alleviate current imbalances between phases in a multi-phase converter and to reduce rapid switching of particular phases. Alternatively, non-transitory FPGA-configuration-instructions may be persistently stored in nonvolatile memory 1920 and accessed by the processing portion 1926 (e.g., during boot up) to configure the hardware-configurable portions of the processing portion 1926 to effectuate the functions of the controllers in FIGS. 10 and 11.

The input component 1930 operates to receive signals (e.g., the control level or waveform 1003 or 1103) that are indicative of one or more aspects of a desired output voltage, current, or power. The signals received at the input component may include, for example, a low-level voltage representative of a high voltage output from the converter. The output component generally operates to provide one or more analog or digital signals to effectuate control of the PWM section 1006 or 1106.

The depicted transceiver component 1928 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A power conversion system comprising:
    a plurality of interleaved switching modules each comprising switches in a half-bridge or full-bridge configuration, and the plurality of interleaved switching modules each providing an output to a coupled inductor and outputs of the coupled inductors being combined to form a summarized output configured for delivery to a load;
    a controller for receiving a control level or waveform;
    a pulse-width modulation section configured to receive a signal from the controller and generate switching signals for the plurality of interleaved switching modules to achieve a value for the summarized output corresponding to the signal from the controller, the pulse-width modulation section configured to:
        drive a first of the interleaved switching modules with a first firing order;
        drive a second of the interleaved switching modules with a second firing order;
        if a next switching cycle will see an increase in a number of interleaved switching modules that are on, then:
            determine if a filtered output of the first of the interleaved switching modules is less than a filtered output of the second of the interleaved switching modules, and if so, then: (1) drive the first switching module with the second firing order; and (2) drive the second switching module with the first firing order; and
        if the next switching cycle will see a decrease in the number of interleaved switching modules that are on, then:
            determine if a filtered output of the first of the interleaved switching modules is greater than a filtered output of the second of the interleaved switching modules, and if so, then: (1) drive the first switching module with the second firing order; and (2) drive the second switching module with the first firing order.

2. The power conversion system of claim 1, wherein comparison of filtered output currents considers a tolerance value.

3. The power conversion system of claim 1, wherein the filtered output is a filtered current output measured after a corresponding one of the coupled inductors.

4. The power conversion system of claim 1, wherein the first interleaved switching module is one that has been on the longest and the second interleaved switching module is one that has been on the next-to-longest.

5. The power conversion system of claim 1, wherein the first interleaved switching module is one that has been off the longest and the second interleaved switching module is one that has been off the next-to-longest.

* * * * *